US011733706B2

(12) United States Patent
M

(10) Patent No.: US 11,733,706 B2
(45) Date of Patent: Aug. 22, 2023

(54) METHOD AND SYSTEM FOR TRAVERSING PLANNED PATH IN MARKED FACILITY

(71) Applicant: GREY ORANGE PTE. LTD., Singapore (SG)

(72) Inventor: Venkadesh M, Virudhunagar (IN)

(73) Assignee: GREY ORANGE PTE. LTD., Singapore (SG)

(*) Notice: Subject to any disclaimer, the term of this patent is extended or adjusted under 35 U.S.C. 154(b) by 187 days.

(21) Appl. No.: 16/749,823

(22) Filed: Jan. 22, 2020

(65) Prior Publication Data

US 2021/0223783 A1 Jul. 22, 2021

(51) Int. Cl.
*G05D 1/02* (2020.01)
*B60W 60/00* (2020.01)
*G05D 1/00* (2006.01)

(52) U.S. Cl.
CPC ..... *G05D 1/0234* (2013.01); *B60W 60/00256* (2020.02); *G05D 1/0088* (2013.01);
(Continued)

(58) Field of Classification Search
CPC ......... G05D 1/0234; G05D 2201/0216; G05D 1/0274; G05D 1/0221; G05D 1/0088;
(Continued)

(56) References Cited

U.S. PATENT DOCUMENTS 8,269,605 B2 * 9/2012 Moore ............... G08B 13/2462
340/10.5

2012/0257788 A1 * 10/2012 Ogasawara ............. G06T 7/136
382/103
(Continued)

FOREIGN PATENT DOCUMENTS

DE 102010030208 A1 * 12/2011 ............ B60W 30/06
EP 0 304 342 A2 2/1989
(Continued)

OTHER PUBLICATIONS

Translation of Hyeri, Park, et al. Marker for Space Recognition, Method for Aligning and Moving Cart Robot by Recognizing Space, and Cart Robot. WO2020256179A1 ed., 2019 (Year: 2019).*
(Continued)

*Primary Examiner* — Kenneth J Malkowski
*Assistant Examiner* — Carville Albert Hollingsworth, IV
(74) *Attorney, Agent, or Firm* — Oblon, McClelland, Maier & Neustadt, L.L.P.

(57) ABSTRACT

A method and a system for traversing a planned path in a marked facility are provided. A transport vehicle transits from a first location to a second location in the marked facility for traversing the planned path. The first and second locations are indicated by first and second location markers, respectively. The transport vehicle records a movement pattern of the transport vehicle, while transiting from the first location to the second location. The transport vehicle halts at an intermediate location when the transport vehicle fails to detect the second location marker at the second location. A first path traversed to reach the intermediate location from the first location is retraced by the transport vehicle based on the recorded movement pattern. On reaching the first location, the transport vehicle re-attempts to transit from the first location to the second location.

16 Claims, 11 Drawing Sheets

(52) U.S. Cl.
    CPC ......... *G05D 1/0221* (2013.01); *G05D 1/0274* (2013.01); *G05D 2201/0216* (2013.01)

(58) Field of Classification Search
    CPC .................. B65G 2209/04; B65G 1/0492; B65G 1/1373; B65G 1/1378; B60W 60/00256
    See application file for complete search history.

(56) References Cited

U.S. PATENT DOCUMENTS

| | | | |
|---|---|---|---|
| 2016/0165795 A1* | 6/2016 | Balutis | G05D 1/0265 701/25 |
| 2017/0193434 A1* | 7/2017 | Shah | G05D 1/0274 |
| 2018/0111609 A1* | 4/2018 | Woo | B60W 30/18036 |
| 2018/0329426 A1* | 11/2018 | Gupta | G05D 1/0223 |
| 2019/0227571 A1* | 7/2019 | Ito | G05D 1/0282 |

FOREIGN PATENT DOCUMENTS

| | | | |
|---|---|---|---|
| EP | 0 304 342 A3 | 2/1989 | |
| KR | 10-2019-0095196 | 8/2019 | |
| WO | WO-2020256179 A1 * | 12/2020 | ............ B25J 11/008 |

OTHER PUBLICATIONS

Translation of Holger, Melenz, et al. Method for Assisting a Driver of a Motor Vehicle. DE102010030208A1 ed., 2006 (Year: 2016).*
Translation of WO2020256179A1 (Year: 2019).*
Translation of DE102010030208A1 (Year: 2010).*
International Search Report and Written Opinion dated May 20, 2021 in PCT/IB2021/000029, 17 pages.

* cited by examiner

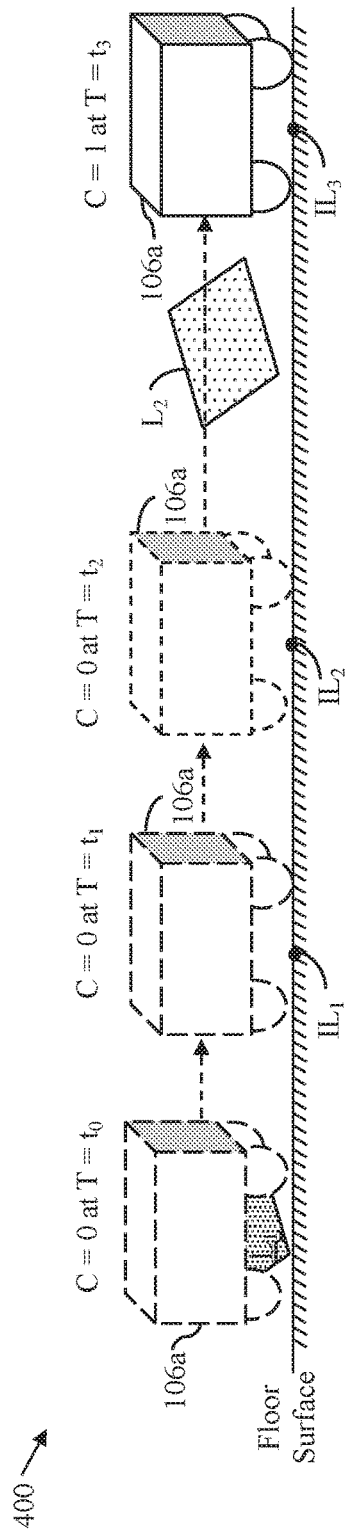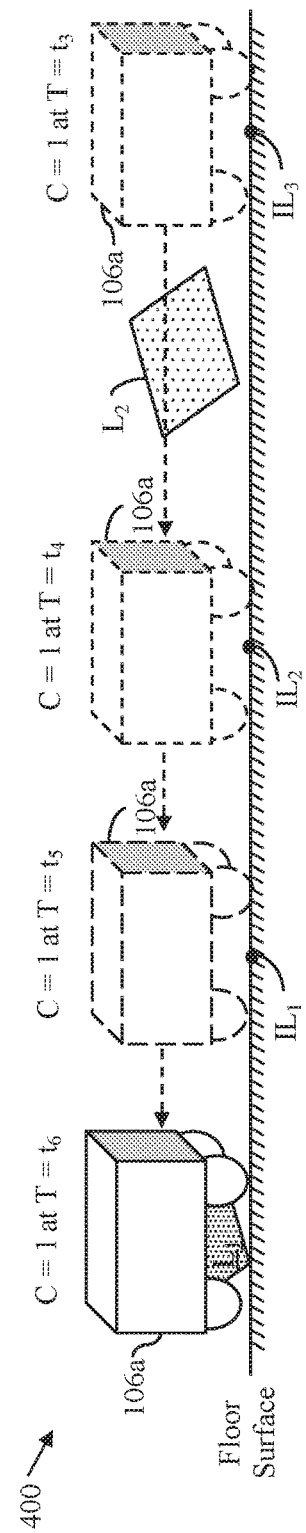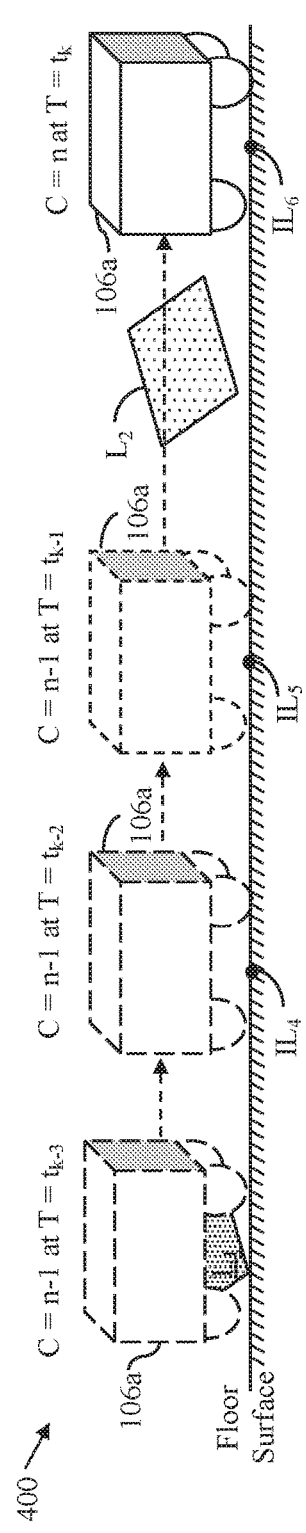

METHOD AND SYSTEM FOR TRAVERSING PLANNED PATH IN MARKED FACILITY

FIELD

The present disclosure relates generally to navigation in a marked facility, and, more particularly to a method and a system for traversing a planned path in a marked facility.

BACKGROUND

Transport vehicles or autonomous guided vehicles may be utilized for performing various operations at a marked facility such as a warehouse, a storage facility, a retail store, a factory, an industrial laboratory, or the like. For example, a transport vehicle may transport a payload (e.g., inventory items or packages) from a first location to a second location in the marked facility. The transport vehicle may transit along a path between the first location and the second location based on various location markers (e.g., first and second location markers, respectively) that are located in the marked facility. Examples of the various location markers include, barcodes, quick response (QR) codes, radio frequency identification (RFID) tags, or the like.

While transiting along the path from the first location to the second location in the marked facility, the transport vehicle may fail to detect the second location marker that corresponds to the second location. The transport vehicle may fail to detect the second location marker due to various reasons, such as, a poor condition of the second location marker, a momentary snag in the transport vehicle preventing the transport vehicle from detecting the second location marker, a speed of the transport vehicle being higher than a threshold speed required to detect the second location marker, or the like. In some scenarios, the transport vehicle may come to a halt when it determines that it has failed to detect the second location marker. Conventional solutions have relied upon humans to intervene in such scenarios, requiring undesirable expenditure of time and human efforts for enabling the transport vehicle to resume operations. Further, a vicinity of the transport vehicle may be cordoned off to prevent hazards such as collisions with other transport vehicles. For example, another transport vehicle transiting near a current location of the transport vehicle may be instructed to traverse an alternate route. As a result, a throughput and an efficiency of operations performed in the marked facility may be severely affected.

In light of foregoing, there exists a need for a technical solution that enables transport vehicles to recover from navigation faults and mitigates a need for human intervention when such navigation faults occur.

SUMMARY

In one embodiment, a method for traversing a planned path in a marked facility is provided. The method comprises a transport vehicle transiting from a first location in the marked facility to a second location in the marked facility for traversing the planned path. The first and second locations are indicated by first and second location markers, respectively. A movement pattern of the transport vehicle is recorded by the transport vehicle while transiting from the first location to the second location. The transport vehicle halts at an intermediate location when the transport vehicle fails to detect the second location marker at the second location. A first path traversed to reach the intermediate location from the first location is retraced by the transport vehicle based on the recorded movement pattern. On reaching the first location, the transport vehicle re-attempts to transit from the first location to the second location.

In another embodiment, a system for traversing a planned path in a marked facility is provided. The system includes a plurality of location markers affixed on a floor surface of the marked facility. The plurality of location markers are indicative of a plurality of locations in the marked facility. The system further includes a transport vehicle that is configured to transit from a first location in the marked facility to a second location in the marked facility for traversing the planned path. The first and second locations are indicated by first and second location markers of the plurality of location markers. The transport vehicle records a movement pattern thereof while transiting from the first location to the second location. The transport vehicle halts at an intermediate location, based on a failure to detect the second location marker at the second location. The transport vehicle retraces a first path traversed to reach the intermediate location from the first location based on the recorded movement pattern. On reaching the first location, the transport vehicle re-attempts to transit from the first location to the second location.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Various embodiments of the present disclosure are illustrated by way of example, and not limited by the appended figures, in which like references indicate similar elements:

FIGS. 4A-4E, collectively represent another exemplary scenario that describes a method for retracing a planned path by a transport vehicle of FIG. 1, in accordance with an exemplary embodiment of the disclosure;

Figure 1:
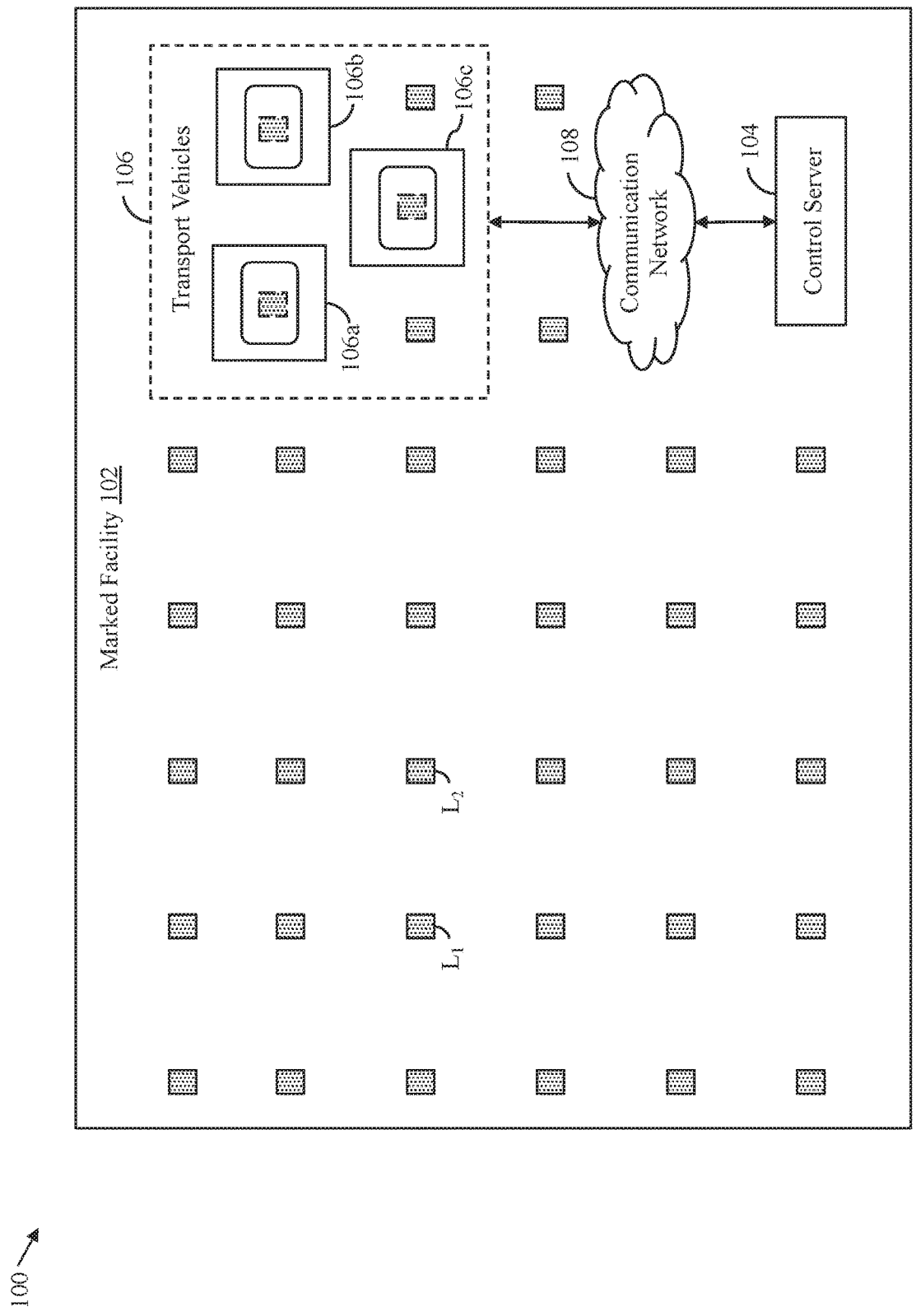
FIG. 1 is a block diagram that illustrates an exemplary environment, in accordance with an exemplary embodiment of the disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Various embodiments of the disclosure provide a method and a system for traversing a planned path in a marked facility. The marked facility may constitute an entirety or a portion of a facility (e.g., a warehouse, a retail store, a factory, an industrial laboratory, or the like). The marked facility may include various location markers to facilitate navigation by one or more transport vehicles that traverse the marked facility. The marked facility may further include a control server that receives various requests from an external communication server for performing one or more operations (e.g., transportation of a payload between various locations in the marked facility). Based on a received request, the control server may select a transport vehicle from the one or more transport vehicles and communicate a transit instruction to the selected transport vehicle for performing a corresponding operation (e.g., transporting a payload from a first location to a second location in the marked facility). The transit instruction may be indicative of a sequence of a plurality of location markers to be traversed by the selected transport vehicle (hereinafter, referred to as 'the transport vehicle'). The transit instruction instructs the transport vehicle to traverse the plurality of location markers in the sequence, as indicated by the transit instruction. This sequence of the plurality of location markers is referred to as 'planned path'. The transit instruction may be indicative of an identifier of the payload, the planned path to be traversed to transit from the first location to the second location, and/or details of corresponding location markers (e.g., identifiers of the first and second location markers that indicate the first and second locations), respectively.

The transport vehicle may receive the transit instruction from the control server for transiting from the first location to the second location in the marked facility. The transport vehicle may begin transiting from the first location towards the second location based on the transit instruction. While transiting from the first location towards the second location, the transport vehicle may record, a movement pattern of the transport vehicle and store the recorded movement pattern in a memory associated with the transport vehicle. The movement pattern of the transport vehicle may include, but is not limited to, a direction of alignment of the transport vehicle with respect to a location marker (e.g., the first location marker), a velocity profile (e.g., a speed and a direction of movement of the transport vehicle), an acceleration profile (e.g., a magnitude and a direction of acceleration or deceleration of the transport vehicle), or the like. The movement pattern may be recorded continuously or at discrete time instances. The transport vehicle may attempt to detect the second location marker. If the transport vehicle fails to detect the second location marker at the second location, the transport vehicle may halt at a current location of the transport vehicle (the current location of the transport vehicle is referred to as an "intermediate location"). The transport vehicle may maintain a counter for tracking the missed location markers. The counter may initially be set to a default value. When the transport vehicle fails to detect the second location marker at an estimated distance from the first location marker located at the first location, the transport vehicle may modify the value of the counter. In other words, the transport vehicle may increment or decrement the value of the counter depending on whether the counter is an up-counter or a down-counter, respectively. Based on the recorded movement pattern, the transport vehicle may then retrace a first path traversed by the transport vehicle to reach the intermediate location from the first location.

On reaching the first location, the transport vehicle may re-attempt to traverse the planned path to transit from the first location to the second location. If the transport vehicle again fails to detect the second location marker, the transport vehicle may halt at another intermediate location, increment the value of the counter, and again retrace a path (e.g., the first path) traversed to reach the intermediate location. On reaching the first location, the transport vehicle may again re-attempt to traverse the planned path to reach the second location from the first location. The transport vehicle may, repeatedly, re-attempt transiting to the second location from the first location as long as the value of the counter is less than a threshold value. When the value of the counter equals the threshold value, the transport vehicle may determine if there is any other location marker included in the planned path. In other words, the transport vehicle may determine presence of a third location after the second location in the planned path. For example, if details of a third location marker (e.g., an identifier of the third location marker) are present in the transit instruction, the transport vehicle may orient itself (i.e., align itself) towards the third location marker that indicates the third location and follow a second path to reach the third location marker from an intermediate location of the transport vehicle. The transport vehicle may further communicate an error notification to the control server indicating that the second location marker is defective. If the third location marker is not indicated by the transit instruction, the transport vehicle may retrace a path (e.g., the first path) back to the first location. When the value of the counter is greater than the threshold value, the transport vehicle may halt at the intermediate location and communicate an error notification to the control server.

Thus, the method and the system improvise a processing circuitry of the transport vehicle, enabling the transport vehicle to retrace a path to recover from navigation faults (e.g., failure to detect a location marker) without human intervention.

In some embodiments, a "marked facility" may constitute an entirety or a portion of a facility such as, but not limited to, a warehouse, a retail store, a factory, or an industrial laboratory. The marked facility may be marked with various location markers located at pre-determined distances. The location markers facilitate navigation by transport vehicles that traverse the facility.

In some embodiments, a "planned path" is a path to be traversed by a transport vehicle for executing an operation in a marked facility. For example, a planned path may refer to a path to be traversed by the transport vehicle for transporting a payload from a first location to a second location in the marked facility. The planned path may define a sequence of locations (or location markers) to be traversed by the transport vehicle for transporting the payload from the first location to the second location.

In some embodiments, "location markers" are markers that are indicative of various locations in a marked facility. Examples of the location markers include, barcodes, quick response (QR) codes, or radio frequency identification (RFID) tags. Each location marker may be indicative of a unique location in the marked facility. A transport vehicle may scan a location marker corresponding to a current location of the transport vehicle to determine a relative position of the transport vehicle in the marked facility.

In some embodiments, "movement pattern" includes various movement parameters of a transport vehicle that are recorded continuously or at discrete time instances while the transport vehicle is transiting from a first location to a second location. The movement pattern includes an angular alignment of the transport vehicle with respect to a location marker of the first location, a velocity profile (e.g., a speed and direction of movement) of the transport vehicle, and/or an acceleration profile (e.g., a magnitude and a direction of acceleration or deceleration) of the transport vehicle that are recorded continuously or at discrete time instances while the transport vehicle is transiting from the first location to the second location.

In some embodiments, "transport vehicle" may be a robotic vehicle (such as an automated guided vehicle, AGV) that executes one or more operations in a marked facility. For example, the transport vehicle may execute an operation for transiting from one location to another location in the marked facility.

In some embodiments, a "control server" is a physical or cloud data processing system on which a server program runs. The control server may be implemented in hardware or software, or a combination thereof. In one embodiment, the control server may be implemented in computer programs executing on programmable computers, such as personal computers, laptops, or a network of computer systems. The control server is responsible for handling various operations in a marked facility.

FIG. 1 is a block diagram that illustrates an exemplary environment 100, in accordance with an exemplary embodiment of the disclosure. The exemplary environment 100 shows a marked facility 102. The marked facility 102 includes a control server (CS) 104 and first through third transport vehicles 106a-106c. Hereinafter, the first through third transport vehicles 106a-106c are collectively referred to as 'the transport vehicles 106'. The CS 104 and the transport vehicles 106 may communicate with each other by way of a communication network 108 or through separate communication networks established therebetween. Examples of the marked facility 102 include, but are not limited to, a storage facility, a warehouse, a retail store, a factory, or an industrial laboratory. In a non-limiting example, the marked facility 102 is a storage facility that stores inventory items or packages for selling and/or fulfilment.

The marked facility 102 may be marked with various fiducial markers or location markers (such as first and second location markers $L_1$ and $L_2$). The marked facility 102 has been shown to include multiple location markers, but, for the sake of brevity, only the first and second location markers $L_1$ and $L_2$ have been labeled. The location markers (e.g., the first and second location markers $L_1$ and $L_2$) may be located at pre-determined locations in the marked facility 102 for indicating the pre-determined locations. The pre-determined locations need not conform to any specific pattern and may be subject to a configuration of the marked facility 102. For example, the location markers may be affixed on a floor surface of the marked facility 102 to indicate the pre-determined locations. For example, the first and second location markers $L_1$ and $L_2$ may be located at first and second locations (e.g., on a floor surface of the marked facility 102). Examples of the location markers may include, but are not limited to, barcodes, quick response (QR) codes, radio frequency identification device (RFID) tags, or the like. In one embodiment, the placement of the location markers is uniform (i.e., a distance between consecutive location markers is constant). In another embodiment, the placement of the location markers may be non-uniform (i.e., a distance between consecutive location markers may be variable).

The marked facility 102 is not limited to include just the CS 104 and the transport vehicles 106. For example, the marked facility 102 may include a storage area, an inventory pick-put station, a sorting station, and/or any other entity for performing one or more operations in the marked facility 102. Examples of the inventory items stored in the marked facility 102 may include, but are not limited to, electronic goods, mechanical goods, automobile parts, groceries, apparel, or the like. The inventory items or the packages may be stored in the storage area (not shown). The storage area may include various portable storage units (PSUs; not shown) for storing the inventory items or packages. The inventory pick-put station may receive various inventory items or packages for replenishment or order fulfilment. The sorting station may be configured to sort the inventory items into various categories, for example, based on size, shape, material, shipping destination, or the like.

The CS 104 may be a network of computers, a software framework, or a combination thereof, that may provide a generalized approach to create the server implementation. Examples of the CS 104 may include, but are not limited to, personal computers, laptops, mini-computers, mainframe computers, any non-transient and tangible machine that can execute a machine-readable code, cloud-based servers, distributed server networks, or a network of computer systems. The CS 104 may be realized through various web-based technologies such as, but not limited to, a Java web-framework, a NET framework, a personal home page (PUP) framework, or any other web-application framework. The CS 104 may be maintained by a storage facility management authority or a third-party entity that manages operations at the marked facility 102. Embodiments of various components of the CS 104 and their functionalities are described later in conjunction with FIG. 5.

The CS 104 may include suitable logic, circuitry, interfaces, and/or code, executed by the circuitry, for facilitating operations performed in the marked facility 102. The CS 104 may be configured to receive, from an external communication server, various requests for performing operations in the marked facility 102. In one embodiment, the CS 104 may receive a request for storing one or more inventory items or packages in the marked facility 102. In another embodiment, the CS 104 may receive a request for fulfilling an order associated with one or more inventory items or packages stored in the marked facility 102. Based on the received requests, the CS 104 may select one or more transport vehicles (e.g., the first through third transport vehicles 106a-106c) for performing one or more operations corresponding to the received requests. Further, the CS 104 may be configured to determine one or more paths to be traversed by the selected one or more transport vehicles for performing the one or more operations. The CS 104 may communicate instructions to the selected one or more transport vehicles for performing the one or more operations. The instructions may be indicative of the determined one or more paths. The selected one or more transport vehicles may perform the one or more operations based on the instructions.

The transport vehicles 106 are robotic vehicles or automated guided vehicles that move in the marked facility 102. The transport vehicles 106 may include suitable logic, instructions, circuitry, interfaces, and/or code, executable by the circuitry, for performing various operations (e.g., transporting various payloads between first and second locations) in the marked facility 102 based on the instructions received from the CS 104. Examples of the payloads may include the PSUs, the inventory items, and/or the packages stored in the marked facility 102. For example, the first location may be a location in the storage area and the second location may be a location of the inventory pick/put station or the sorting station. A transport vehicle (e.g., the first transport vehicle 106a) may determine its relative position in the marked facility 102 by scanning and/or identifying a location marker corresponding to the position of the first transport vehicle 106a. Thus, the transport vehicles 106 may navigate the marked facility 102 by way of the location markers (e.g., the first and second location markers $L_1$ and $L_2$). The transport vehicles 106 are responsive to the instructions received from the CS 104 and perform one or more operations based on the received instructions. The transport vehicles 106 are explained in conjunction with FIG. 2.

The communication network 108 is a medium through which content and instructions are transmitted between the CS 104, the transport vehicles 106, and/or other entities in the marked facility 102. Examples of the communication network 108 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the exemplary environment 100 may connect to the communication network 108 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the CS 104 may receive a first request (e.g., a request for fulfilment of an order). The CS 104 may select one of the transport vehicles 106 (e.g., the first transport vehicle 106a) for transporting inventory items or packages required for the fulfilment of the order. In a non-limiting example, the first transport vehicle 106a may be selected based on a proximity of the first transport vehicle 106a to a PSU, in the storage area, that stores the inventory items or packages corresponding to the order. In a non-limiting example, it is assumed that a current location of the first transport vehicle 106a is same as a location of the PSU.

Based on the first request, the CS 104 may determine a path (i.e., a planned path) to be traversed from the current location of the first transport vehicle 106a to the inventory pick/put station for the fulfilment of the order. The planned path may be defined as a sequence of location markers that are to be traversed, by the first transport vehicle 106a, for reaching a second location (i.e., the location of the inventory pick/put station) from the first location (i.e., the current location of the first transport vehicle 106a). The planned path may indicate that the first transport vehicle is to traverse the first and second location markers $L_1$ and $L_2$, indicative of the first and second locations, in that order or sequence. Based on the selection of the first transport vehicle 106a and the determination of the planned path, the CS 104 may communicate a transit instruction to the first transport vehicle 106a. The transit instruction may be indicative of the planned path to be traversed by the first transport vehicle 106a. In other words, the transit instruction may include details of the first and second location markers $L_1$ and $L_2$ to be traversed by the first transport vehicle 106a. For example, the transit instruction may include identifiers of the first and second location markers $L_1$ and $L_2$. The transit instruction may be further indicative of an estimated distance between the first and second location markers $L_1$ and $L_2$. In another embodiment, where the planned path is defined as a sequence of more than two location markers, the transit instruction may be indicative of distances between consecutive location markers included in the sequence. The first transport vehicle 106a receives the transit instruction that instructs the first transport vehicle 106a to traverse the planned path.

The first transport vehicle 106a may be configured to scan, detect, and/or identify location markers (e.g., the first and second location markers $L_1$ and $L_2$) in the planned path to be traversed by the first transport vehicle 106a. The first transport vehicle 106a may include various sensors (such as image sensors, RFID sensors, and/or the like) for scanning the location markers. The first transport vehicle 106a may utilize the location markers included in the planned path for transiting from the first location to the second location. The first transport vehicle 106a may be further configured to record a movement pattern of the first transport vehicle 106a while transiting from the first location to the second location. The recorded movement pattern may include, but is not limited to, an angular alignment of the first transport vehicle 106a with respect to the first location marker $L_1$, a velocity profile of the first transport vehicle 106a (e.g., a speed and/or a direction of movement of the first transport vehicle 106a), an acceleration profile of the first transport vehicle 106a (e.g., a magnitude and a direction of acceleration or deceleration of the first transport vehicle 106a), and/or the like. The first transport vehicle 106a may record the movement pattern using various sensors (e.g., motion sensors, odometric sensors, accelerometers, gyroscopes, or the like). The first transport vehicle 106a may utilize sensor data from the sensors to record the movement pattern continuously or at discrete time instances while the first transport vehicle 106a transits from the first location to the second location along the planned path. The first transport vehicle 106a may store the recorded movement pattern in a memory of the first transport vehicle 106a. The first transport vehicle 106a may attempt to detect the second location marker $L_2$ at the second location.

In one embodiment, the first transport vehicle 106a may successfully detect the second location marker $L_2$. In such a scenario, the first transport vehicle 106a may halt at the second location and communicate a notification to the CS 104 indicating that the first transport vehicle 106a has reached the second location.

In another embodiment, the first transport vehicle 106a may determine that the first transport vehicle 106a has failed to detect the second location marker $L_2$. The first transport vehicle 106a may fail to detect the second location marker $L_2$ due to various reasons that are explained in conjunction with FIG. 3. In such a scenario, the first transport vehicle 106a may halt at a current location of the first transport vehicle 106a. The current location at which the first transport vehicle 106a has halted is referred to as an intermediate location. The first transport vehicle 106a may further maintain a counter (e.g., an up-counter or a down-counter) to measure a number of times the first transport vehicle 106a fails to detect the second location marker $L_2$. In a non-limiting example, the counter is an up-counter. The counter may initially be set to a default value (e.g., c=0). When the first transport vehicle 106a fails to detect a location marker (for example, the second location marker $L_2$), the first transport vehicle 106a may increment the value of the counter (e.g., c=1). In another embodiment, where the counter is a down-counter, a default value of the counter may be greater than the threshold value of the counter. For example, the default value of the counter may be equal to three (i.e., c=3) and the threshold value may be equal to zero. In such a scenario, the first transport vehicle 106a may decrement the value of the counter (i.e., c=2), when the first transport vehicle 106a fails to detect a location marker.

Based on the failure to detect the second location marker $L_2$, the first transport vehicle 106a may attempt to retrace a first path that was traversed to reach the intermediate location. The first transport vehicle 106a may retrace the path based on the recorded movement pattern. The first transport vehicle 106a may reach the first location marker $L_1$ and re-attempt to transit from first location to the second location. If the first transport vehicle 106a is successful in detecting the second location marker $L_2$ at the second location, the first transport vehicle 106a may halt at the second location and communicate the notification to the CS 104. If the first transport vehicle 106a fails again in detecting the second location marker $L_2$, the first transport vehicle 106a may halt at another intermediate location and increment the counter (i.e., c=2). The first transport vehicle 106a may retrace the path (e.g., the first path) traversed by the first transport vehicle 106a to reach the intermediate location and re-attempt to transit from the first location to the second location by traversing the planned path if the value of the counter is less than the threshold value.

The threshold value defines an upper limit on a number of times the first transport vehicle 106a is allowed to re-attempt transiting from the first location to the second location. In a non-limiting example, the CS 104 may set the threshold value of the counter by communicating one or more commands to the first transport vehicle 106a. The CS 104 may modify the threshold value at any time instance without deviating from the scope of the disclosure. It will be apparent to those of skill in the art that the threshold value may be set to any value based on operational requirements and does not limit the scope of the disclosure. For the sake brevity, the threshold value is assumed to be three.

In an exemplary scenario, it is assumed that first transport vehicle 106a has attempted to transit from the first location to the second location thrice and has failed to detect the second location marker in all three attempts. In such a scenario, the value of the counter may be equal to three (i.e., c=3), i.e., the threshold value. When the value of the counter is equal to the threshold value (i.e., c=3), the first transport vehicle 106a may determine if details of any other location markers (e.g., a third location marker) are included in the transit instruction. In other words, the first transport vehicle 106a may attempt to detect a presence of a third location after the second location in the planned path when the value of the counter is equal to the threshold value. If the first transport vehicle 106a detects the presence of third location to be traversed after reaching the second location marker, the first transport vehicle 106a may follow a second path to transit from the intermediate location to the third location indicated by the third location marker. If the first transport vehicle 106a determines that there are no other location markers (i.e., if the presence of the third location is not detected), the first transport vehicle 106a may once again retrace a path (e.g., the first path) traversed to reach the intermediate location, reach the first location, and re-attempt traversing the planned path to reach the second location. When the value of the counter exceeds the threshold value (i.e., when c>3), the first transport vehicle 106a halts at another intermediate location and communicates an error notification to the CS 104.

In another exemplary scenario, the navigation faults in the transport vehicles 106a-106c may occur due to external factors in operating environment of the marked facility 102. For example, earthquake tremors, fallen articles, or dust accumulated in planned trajectory of the transport vehicles 106a-106c. In such a scenario, the server may issue a halt instruction to all the transport vehicles 106a-106c running in the marked facility 102. Further, the server 104 may communicate the transport vehicles 106a-106c to perform a retrace operation to reach the previous marker of their current location in the respective planned trajectories.

Figure 2:
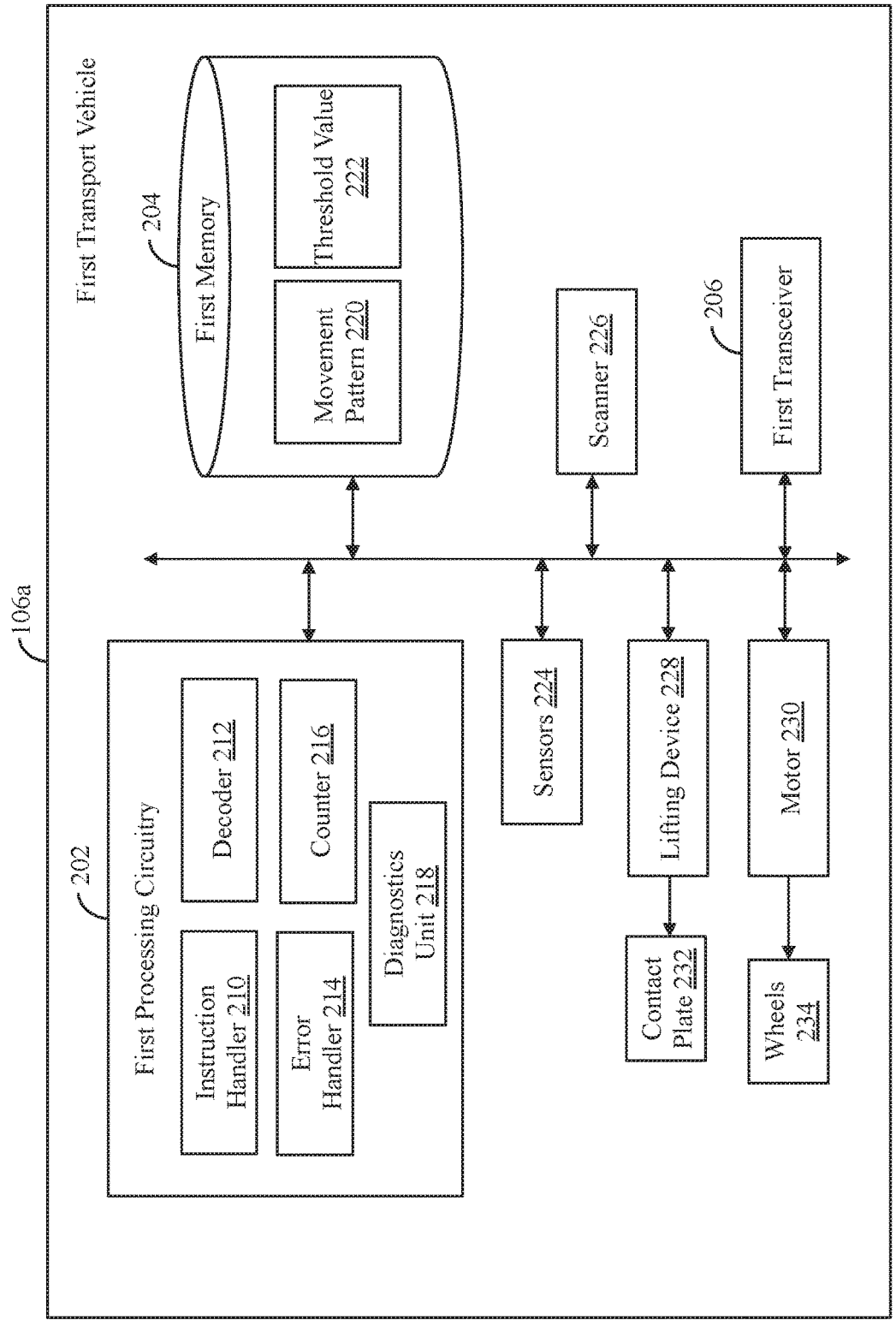
FIG. 2 is a block diagram that illustrates a transport vehicle of FIG. 1, in accordance with an exemplary embodiment of the disclosure.

FIG. 2 is a block diagram that illustrates the first transport vehicle 106a, in accordance with an exemplary embodiment of the disclosure. While FIG. 2 is explained in conjunction with the first transport vehicle 106a, it will be apparent to those of skill in the art that the second and third transport vehicles 106b and 106c may be similar to the first transport vehicle 106a.

The first transport vehicle 106a may include a first processing circuitry 202, a first memory 204, and a first transceiver 206 that communicate with each other by way of a first communication bus 208. The first processing circuitry 202 may include an instruction handler 210, a decoder 212, an error handler 214, a counter 216, and a diagnostics unit 218. It will be apparent to a person having ordinary skill in the art that the transport vehicles 106 are not limited to any specific combination of hardware circuitry and software.

The first processing circuitry 202 may include suitable logic, instructions, circuitry, interfaces, and/or code, executable by the circuitry, for implementing various operations such as transiting from the first location to the second location, or the like. Examples of the first processing circuitry 202 include, but not limited to, an application-specific integrated circuit (ASIC) processor, a reduced instruction set computing (RISC) processor, a complex instruction set computing (CISC) processor, a field-programmable gate array (FPGA), a combination of a central processing unit (CPU) and a graphics processing unit (GPU), a microcontroller, and/or the like.

The first memory 204 may include suitable logic, instructions, circuitry, interfaces, and/or code, executable by the circuitry, to store the movement pattern of the first transport vehicle 106a (hereinafter, referred to as 'the movement pattern 220') and the threshold value (hereinafter referred to as 'the threshold value 222'). Examples of the first memory 204 include a random-access memory (RAM), a read-only memory (ROM), a removable storage drive, a hard disk drive (HDD), a flash memory, a solid-state memory, and the like. In one embodiment, the first memory 204 may be realized through various database technologies such as, but not limited to, Microsoft SQL, Oracle, IBM DB2, Microsoft Access, PostgreSQL, MySQL, and SQLite. It will be apparent to a person skilled in the art that the scope of the disclosure is not limited to realizing the first memory 204 in the first transport vehicle 106a, as described herein.

The movement pattern 220 may indicate various movement parameters of the first transport vehicle 106a. The movement pattern 220 may include an angular alignment of the first transport vehicle 106a with respect to one of the location markers (e.g., the first location marker $L_1$) or an axis (e.g., x-axis or y-axis), the velocity profile of the first transport vehicle 106a, the acceleration profile of the first transport vehicle 106a, or the like. The velocity profile of the first transport vehicle 106a may include, but is not limited to, a speed or velocity of the first transport vehicle 106a at various time instances, a direction of movement of the first transport vehicle 106a at the various time instances, or the like. Similarly, the acceleration profile of the first transport vehicle 106a may include, but is not limited to, a magnitude of acceleration or deceleration of the first transport vehicle 106a at the time instances, a direction of acceleration or deceleration of the first transport vehicle 106a at the various time instances, or the like.

The movement pattern 220 may be recorded continuously or at discrete the time instances by the first processing circuitry 202 and stored in the first memory 204. The movement pattern 220 may be recorded while the first transport vehicle 106a is transiting between various locations (e.g., the first and second locations) based on the transit instruction. For example, the movement pattern 220 is recorded at various time instances when the first transport vehicle 106a is transiting from the first location to the second location. The first processing circuitry 202 may determine and record, by storing in the first memory 204, the angular alignment of the first transport vehicle 106a with respect to the first location marker $L_1$, the speed or velocity of the first transport vehicle 106a, a direction of movement of the first transport vehicle 106a, the magnitude of acceleration or deceleration of the first transport vehicle 106a, and the direction in which the first transport vehicle 106a is accelerating or decelerating at each of the various time instances.

The threshold value 222 may be set by the CS 104. The CS 104 may modify the threshold value 222 by way of one or more commands that may be communicated to the first transport vehicle 106a. The first processing circuitry 202 may determine how many times the first transport vehicle 106a fails to detect a certain location marker (e.g., the second location marker $L_2$). The value of the counter 216 is initially set to the default value and may be incremented by the first processing circuitry 202 whenever the location marker is not detected. For example, when the value of the counter 216 is equal to one (i.e., c=1), the first transport vehicle 106a has missed detecting the location marker (for example, the second location marker $L_2$) once.

The first transceiver 206 may transmit and receive data over the communication network 108 using one or more communication network protocols. The first transceiver 206 may receive various requests, instructions, and/or commands from the CS 104. For example, the first transceiver 206 receives the transit instruction from the CS 104. The first transceiver 206 may transmit various notifications (e.g., error notifications) and messages to the CS 104. Examples of the first transceiver 206 include, but are not limited to, an antenna, a radio frequency transceiver, a wireless transceiver, a Bluetooth transceiver, an ethernet based transceiver, universal serial bus (USB) transceiver, or any other device configured to transmit and receive data.

The first transport vehicle 106a may further include sensors 224, a scanner 226, a lifting device 228, and a motor 230. The sensors 224 may include, but are not limited to, position sensors, accelerometers, gyroscopes, optical encoders, or the like to record the movement pattern 220 of the first transport vehicle 106a. The first processing circuitry 202 may process sensor data captured by the sensors 224, at various time instances, to obtain the movement pattern 220 of the first transport vehicle 106a. The first processing circuitry 202 may store the obtained movement pattern 220 as a record in the first memory 204. The first transport vehicle 106a may further include other sensors (e.g., sensors for an obstacle detection system, ODS) without deviating from the scope of the disclosure.

The scanner 226 may include an image or an RFID scanner (i.e., one or more sensors for scanning images or RFID codes) for scanning and/or detecting location markers (e.g., the first location marker $L_1$) at the marked facility 102. For example, the scanner 226 may be an image sensor used to scan the location markers when the location markers are in a form of QR codes or barcodes.

The lifting device 228 may include suitable logic, instructions, circuitry, interfaces, and/or code, executable by the circuitry, for measuring a weight of a payload (e.g., a PSU) carried by the first transport vehicle 106a. Based on the weight of the payload, the lifting device 228 may control a lifting mechanism that is used to raise a contact plate 232 connected to the lifting device 228. The contact plate 232 may be raised or lowered based on the weight of the payload to lower a center of gravity of the first transport vehicle 106a. A low center of gravity may be necessary to ensure that the payload is stable when carried by the first transport vehicle 106a. The first processing circuitry 202 may adjust a speed of the first transport vehicle 106a based on the weight of the payload.

The motor 230 may include suitable logic, instructions, circuitry, interfaces, and/or code, executable by the circuitry, for controlling movement of wheels 234 of the first transport vehicle 106a. The motor 230 may be configured to receive movement instructions from the first processing circuitry 202. Based on the movement instructions, the motor 230 may control the direction of alignment, the speed, the direction of movement, the magnitude of acceleration, and the direction of acceleration of the first transport vehicle 106a using the wheels 234. In other words, the motor 230 may be configured to move or halt the first transport vehicle 106a by way of the wheels 234.

The first processing circuitry 202 may perform various operations in the marked facility 102 by way of the instruction handler 210, the decoder 212, the error handler 214, the counter 216, and the diagnostics unit 218. The instruction handler 210 may receive various instructions and messages from the CS 104 by way of the first transceiver 206 included in the first transport vehicle 106a. For example, the instruction handler 210 may receive the transit instruction from the CS 104. The instruction handler 210 may communicate movement instructions to the motor 230 based on the transit instruction.

The decoder 212 may include suitable logic, instructions, circuitry, interfaces, and/or code, executable by the circuitry, for decoding and identifying the location markers (e.g., the first and second location markers $L_1$ and $L_2$) scanned by the scanner 226. Based on the decoding of the scanned location markers, the decoder 212 may determine whether location markers associated with the transit instruction are successfully detected. The error handler 214 may be responsible for communicating various error notifications to the CS 104 whenever any error occurs during an operation (e.g., when the first transport vehicle 106a is transiting from the first location to the second location). For example, the error handler 214 may determine that a location marker (e.g., the second location marker $L_2$) is damaged when the value of the counter 216 exceeds the threshold value 222 and may communicate an error notification to the CS 104, indicating that the location marker may be damaged.

The counter 216 may include suitable logic, instructions, circuitry, interfaces, and/or code, executable by the circuitry, for measuring a number of times the first transport vehicle 106a fails to detect a certain location marker. The value of the counter 216 may be incremented whenever the decoder 212 fails to detect a certain location marker (e.g., the second location marker $L_2$). The counter 216 is further configured to reset to the default value (i.e., zero) when the location marker (e.g., the second location marker $L_2$) is successfully detected.

The diagnostics unit 218 may include suitable logic, instructions, circuitry, interfaces, and/or code, executable by the circuitry, for performing various diagnostic tests to determine whether various components of the first transport vehicle 106a (e.g., the sensors 224, the scanner 226, the motor 230, or the like) are functioning properly. For example, when the first transport vehicle 106a fails to detect the second location marker $L_2$, the diagnostics unit 218 may run one or more diagnostic tests on the motor 230, the decoder 212, the scanner 226, or the like. For example, if the one or more diagnostic tests indicate that the motor 230 is faulty, the error handler 214 may communicate an error notification to the CS 104, indicating that the motor 230 is faulty.

Figure 3A:
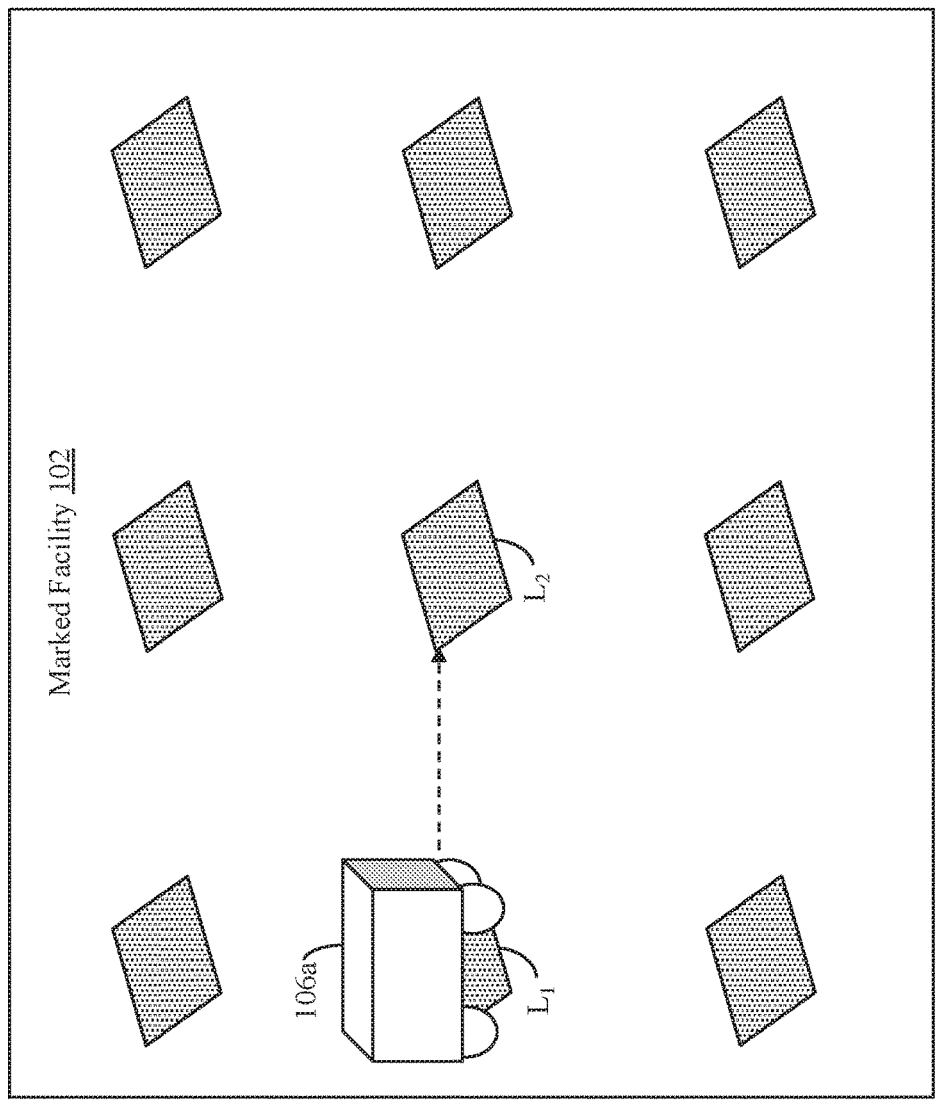
FIGS. 3A-3D, collectively represent an exemplary scenario that describes a method for retracing a planned path by a transport vehicle of FIG. 1, in accordance with an exemplary embodiment of the disclosure.

FIGS. 3A-3D, collectively represent an exemplary scenario 300 that describes a method for retracing a planned path by the first transport vehicle 106a, in accordance with an exemplary embodiment of the disclosure. FIG. 3A shows a section of the marked facility 102, the first transport vehicle 106a, and the location markers (for example, the first and second location markers $L_1$ and $L_2$).

With reference to FIG. 3A, the CS 104 may receive the first request from the external communication server for transporting the inventory items or packages from the first location to the second location in the marked facility 102. In one embodiment, the first request may be an item retrieval request. In another embodiment, the first request may be an item placement request. The first request may include information pertaining to the inventory items or packages that are to be transported from the first location to the second location. Based on the first request, the CS 104 may retrieve, from a second memory of the CS 104 (shown in FIG. 5), a virtual map of the marked facility 102 and transport vehicle data of the transport vehicles 106 from its memory. The transport vehicle data may include, but is not limited to, a current location of each of the transport vehicles 106, a load handling capacity of each of the transport vehicles 106, or the like.

Based on the transport vehicle data, the CS 104 may select, based on various selection factors, at least one of the transport vehicles 106 for transporting the inventory items or packages from the first location to the second location. The selection factors may include, but are not limited to, availability of the transport vehicles 106, the load handling capacities of the transport vehicles 106, weight of a payload corresponding to the first request, distances between current locations of the transport vehicles 106 and the first location, or a combination thereof. For example, based on the current locations of the transport vehicles 106, the CS 104 may determine that the first transport vehicle 106a is nearest to the first location. As described in the foregoing description of FIG. 1, the current location of the first transport vehicle 106a may be the same as the first location. Thus, the CS 104 may select the first transport vehicle 106a for catering to the first request.

On selection of the first transport vehicle 106a, the CS 104 may identify one or more paths for transiting from the first location to the second location. Based on the identified one or more paths, the CS 104 may determine an optimal path for transiting from the first location to the second location. The CS 104 may determine the optimal path based on various factors such as a travel cost associated with each identified path, availability of the identified paths in the marked facility 102, paths being traversed by other transport vehicles (e.g., the second and third transport vehicles 106b and 106c), or the like. The travel cost associated with each identified path may be a function of an estimated time taken to traverse a corresponding identified path by a corresponding transport vehicle, a number of location markers to be traversed in the corresponding identified path, and/or the like. The determined optimal path (i.e., the planned path) is the path that is to be traversed by the first transport vehicle 106a. As described in the foregoing, the planned path is indicative of a plurality of location markers to be transited by the first transport vehicle 106a in a sequential fashion. For example, as shown in FIG. 3A, the planned path warrants sequential traversal, by the first transport vehicle 106a, of the first and second location markers $L_1$ and $L_2$ (i.e., $L_1 \rightarrow L_2$).

The CS 104 may communicate, to the first transport vehicle 106a, the transit instruction based on the determination of the planned path. The transit instruction may be indicative of the planned path to be traversed by the first transport vehicle 106a and estimated distances between consecutive location markers (e.g., the estimated distance between the first and second location markers $L_1$ and $L_2$) included in the planned path. The transit instruction may further include details of the location markers included in the planned path (e.g., the identifiers of the first and second location markers $L_1$ and $L_2$). The transit instruction, received by the first transport vehicle 106a, instructs the first transport vehicle 106a to traverse the planned path.

Figure 3B:
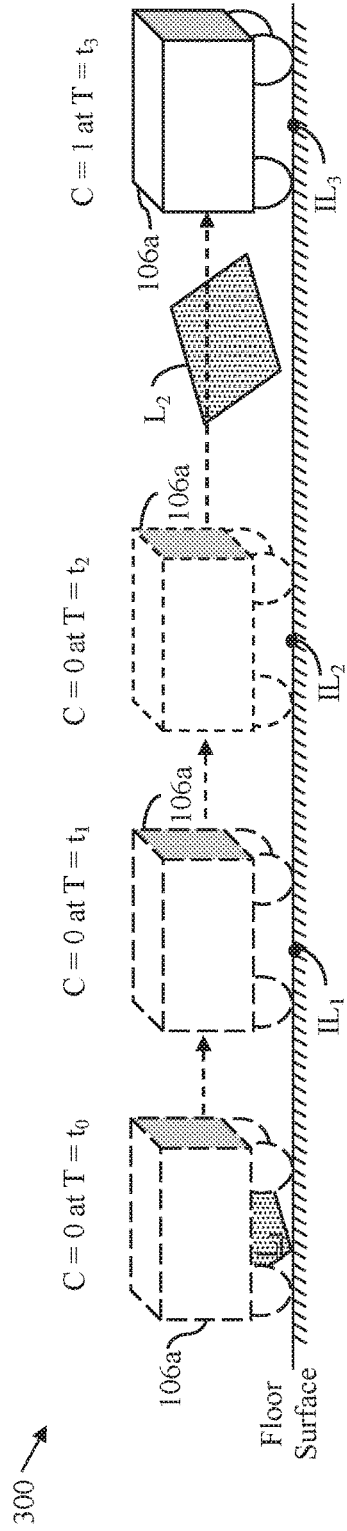

With reference to FIG. 3B, the current location of the first transport vehicle 106a is shown to correspond to the first location marker $L_1$ (i.e., the first transport vehicle 106a is currently at the first location). Based on the transit instruction, the first transport vehicle 106a may be required to transit from the first location marker $L_1$ to the second location marker $L_2$ (i.e., transit from the first location to the second location). Initially, when the first transport vehicle 106a is at the first location marker $L_1$ (i.e., at a first time instance $T=t_0$), the value of the counter 216 may be equal to the default value (i.e., c=0). The first transport vehicle 106a may start traversing the planned path to reach the second location marker $L_2$. The first transport vehicle 106a may transport a payload (i.e., the inventory items and/or packages; not shown) while traversing the planned path. While transiting from the first location to the second location, the first transport vehicle 106a may record the movement pattern 220 of the first transport vehicle 106a at various time instances. The movement pattern 220 may be recorded by the first processing circuitry 202. As shown in FIG. 3B, the first transport vehicle 106a reaches first through third intermediate locations $IL_1$, $IL_2$, and $IL_3$ at second through fourth time instances $T=t_1$, $T=t_2$, $T=t_3$, respectively. In a non-limiting example, based on the recorded movement pattern 220 and the estimated distance between the first and second location markers $L_1$ and $L_2$, the first transport vehicle 106a may determine that the first transport vehicle 106a has failed to detect the second location marker $L_2$.

The first transport vehicle 106a may fail to detect a location marker due to various reasons (referred to as 'navigation faults'). In one embodiment, the speed of the first transport vehicle 106a may be greater than a threshold speed required to detect the location marker, rendering the first transport vehicle 106a unable to properly scan and/or detect the location marker. For example, a location marker (e.g., a barcode) scanned by the scanner 226 may be blurred if the speed of the first transport vehicle 106a is greater than the threshold speed, preventing the decoder 212 from being able to properly decode the scanned location marker. In another embodiment, the location marker may be damaged or worn out, preventing the decoder 212 from correctly identifying the location marker even if the first transport vehicle 106a is at a location corresponding to the location marker. In another embodiment, one or more components (e.g., the scanner 226, the motor 230, or the wheels 234) of the first transport vehicle 106a may be faulty. For example, incorrect functioning of the motor 230 may result in incorrect movement of the wheels 234, causing the first transport vehicle 106a to deviate from the planned path. It will be apparent to those of skill in the art that the first transport vehicle 106a may fail to detect a location marker due a reason other than those described above, without departing from the scope of the disclosure.

The determination that the first transport vehicle 106a has failed to detect the second location marker $L_2$ may be based on a comparison between a distance traversed by the first transport vehicle 106a from the first time instance $T=t_0$ to the fourth time instance $T=t_3$ and the estimated distance between the first and second location markers $L_1$ and $L_2$. The first transport vehicle 106a may determine that it has failed to detect the second location marker $L_2$ if a distance traversed by the first transport vehicle 106a to reach the third intermediate location $IL_3$ exceeds or equals the estimated distance. In the current embodiment, the distance between the first location and the third intermediate location $IL_3$ (i.e., the distance traversed by the first transport vehicle 106a between the first time instance $T=t_0$ and the fourth time instance $T=t_3$) exceeds the estimated distance between the first and second location markers $L_1$ and $L_2$. Therefore, on reaching the third intermediate location $IL_3$, the first transport vehicle 106a may determine that the first transport vehicle 106a has traversed more than the estimated distance between the first and second location markers $L_1$ and $L_2$, failing to detect the second location marker $L_2$ at the second location. In such a scenario, the diagnostics unit 218 may run various diagnostics tests to verify whether various components (e.g., the sensors 224, the scanner 226, the motor 230, or the wheels 234) of the first transport vehicle 106a are functioning properly. If the diagnostics unit 218 determines any of the various components is not functioning properly, the first transport vehicle 106a may communicate an error notification to the CS 104, indicating that a component (e.g., the scanner 226 or the motor 230) necessary for traversing the first path and/or detecting location markers may be faulty. In such a scenario, the first transport vehicle 106a may remain halted at the third intermediate location $IL_3$ and may require manual intervention by the CS 104 or an operator to resume operation. In a non-limiting example, it is assumed that the diagnostics unit 218 determines that each of the various components is functioning properly.

The first transport vehicle 106a may halt at the third intermediate location $IL_3$ and increment the value of the counter 216 (i.e., c=1) indicating the failure to detect the second location marker $L_2$ for the first time. The first transport vehicle 106a may compare the value of the counter 216 to the threshold value 222. Based on the comparison, the first transport vehicle 106a may determine that the value of the counter 216 is less than the threshold value 222 (i.e., 3). Consequently, the first transport vehicle 106a may attempt to retrace a first path followed by the first transport vehicle 106a to reach the third intermediate location $IL_3$ from the first location indicated by the first location marker $L_1$.

For retracing the first path, the first transport vehicle 106a may utilize the movement pattern 220 that was recorded while traversing the planned path. Based on the movement pattern 220, the first transport vehicle 106a may align itself towards the first location marker $L_1$. In other words, the first transport vehicle 106a may adjust its angular alignment to orient itself towards the first location marker $L_1$. For example, the first transport vehicle 106a may determine that the first transport vehicle 106a has to perform an angular rotation (e.g., $\theta°$) to retrace the first path. The first transport vehicle 106a may further determine a speed required to retrace the first path based on the recorded movement pattern 220. In a non-limiting example, the first transport vehicle 106a may retrace the first path at a slow pace and may utilize the ODS to detect and avoid collisions with any obstacles (e.g., other transport vehicles).

Figure 3C:
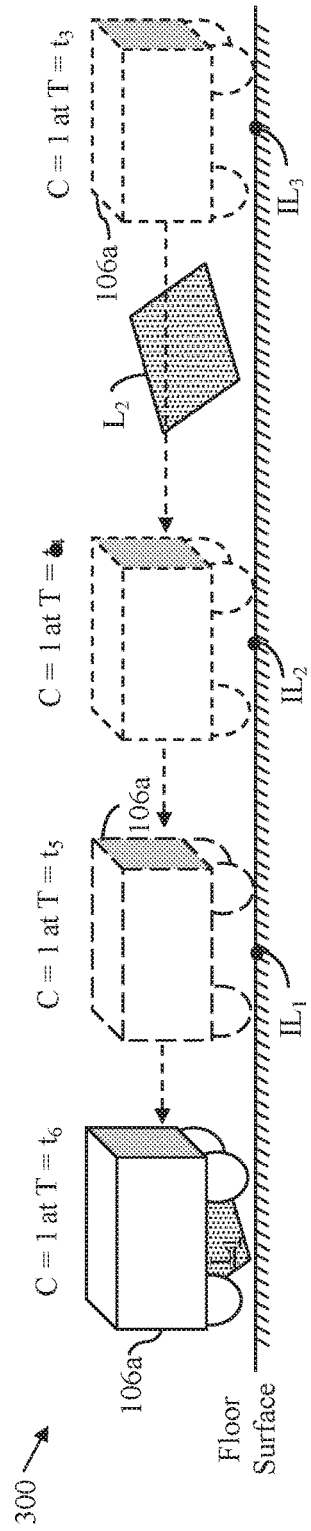

With reference to FIG. 3C, the first transport vehicle 106a is shown to retrace the first path by transiting from the third intermediate location $IL_3$ towards the first location indicated by the first location marker $L_1$. At a fifth time instance $T=t_4$, the first transport vehicle 106a may reach the second intermediate location $IL_2$. At a sixth time instance $T=t_5$, the first transport vehicle 106a may transit from the second intermediate location $IL_2$ to the first intermediate location $IL_1$. At a seventh time instance $T=t_6$, the first transport vehicle 106a may transit from the first intermediate location $IL_1$ to the first location indicated by the first location marker $L_1$. On reaching the first location, the first transport vehicle 106a may attempt to scan and detect the first location marker $L_1$ at the first location by way of the scanner 226 and the decoder 212. In one example, the first transport vehicle 106a may fail to detect the first location marker $L_1$. In such a scenario, the first transport vehicle 106a may halt at its current location and communicate an error notification to the CS 104. In a non-limiting example, it is assumed that the first transport vehicle 106a successfully detects the first location marker $L_1$. In such a scenario, the first transport vehicle 106a may orient itself towards the second location and may re-attempt to traverse the planned path for transiting from the first location to the second location.

Figure 3D:
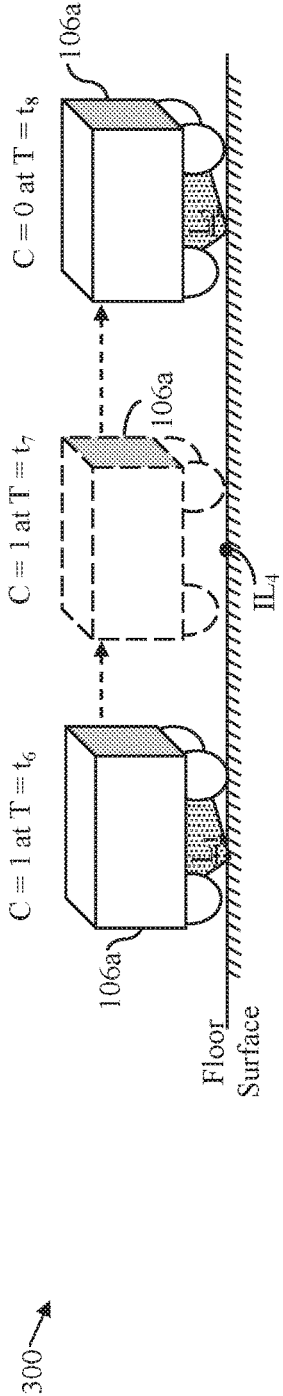

With reference to FIG. 3D, the first transport vehicle 106a is shown to re-attempt transiting to the second location, from the first location, by traversing the planned path. Initially, at the seventh time instance $T=t_6$, the value of the counter 216 is one (i.e., c=1) and the first transport vehicle 106a is at the first location marker $L_1$. At the seventh time instance $T=t_6$, the first transport vehicle 106a may begin traversing the planned path to reach the second location. At an eighth time instance $T=t_7$, the first transport vehicle 106a may reach a fourth intermediate location $IL_4$ between the first and second locations. At a ninth time instance $T=t_8$, the first transport vehicle 106a may reach the second location and may successfully detect the second location marker $L_2$. When the first transport vehicle 106a detects the second location marker $L_2$, the first transport vehicle 106a may reset the value of the counter 216 to the default value (i.e., c=0). On reaching the second location marker $L_2$, the first transport vehicle 106a may determine that the planned path is completely traversed and may halt at the second location.

In another embodiment, the first transport vehicle 106a may, again, fail to detect the second location marker $L_2$ and may halt at any intermediate location when the first transport vehicle 106a determines that it has failed to detect the second location marker $L_2$. In such a scenario, the first transport vehicle 106a may increment the value of the counter 216 (i.e., c=2) and compare the value of the counter 216 to the threshold value 222. The first transport vehicle 106a may determine that the value of the counter 216 is less than the threshold value 222. Based on the determination, the first transport vehicle 106a may again retrace a path (e.g., the first path) traversed to reach the intermediate location (as described in the foregoing).

The first transport vehicle 106a may continue to retrace its path and re-attempt to reach the second location until the value of the counter 216 equals the threshold value 222 (e.g., 3). In a scenario where the first transport vehicle 106a, yet again, fails to detect the second location marker $L_2$ and the value of the counter 216 equals the threshold value 222 (e.g., 3), the first transport vehicle 106a may determine whether the transit instruction includes any location beyond the second location that is to be transited by the first transport vehicle 106a after reaching the second location. In other words, the first transport vehicle 106a may detect, based on the transit instruction, a presence of a third location after the second location in the planned path. If the first transport vehicle 106a detects, based on the transit instruction, the third location after the second location in the planned path, the first transport vehicle 106a may orient itself towards a third location marker that indicates the third location and attempt to transit from the intermediate location (e.g., the third intermediate location $IL_3$) to the third location. An exemplary scenario where the first transport vehicle 106a attempts to transit from the intermediate location to a location subsequent to the second location is described later in conjunction with FIGS. 4A-4E.

However, in the exemplary scenario 300, the transit instruction includes the details of only the first and second location markers $L_1$ and $L_2$. In a scenario where the undetected location marker (i.e., the second location marker $L_2$) is the last location marker in the planned path and the value of the counter 216 equals the threshold value 222 (e.g., 3), the first transport vehicle 106a again retraces its path that was followed by the first transport vehicle 106a to reach the intermediate location. On reaching the first location, the first transport vehicle 106a may re-attempt traversing the planned path. If the first transport vehicle 106a, while attempting to transit to the second location, determines, at another intermediate location, that it has failed to detect the second location marker $L_2$, the first transport vehicle 106a may, yet again, increment the value of the counter 216 (i.e., c=4). The first transport vehicle 106a may then compare the value of the counter 216 and the threshold value 222, and determine that the value of the counter 216 exceeds the threshold value 222. Based on the determination, the first transport vehicle 106a may halt at the intermediate location and communicate an error notification to the CS 104, indicating the first transport vehicle 106a is halted at the intermediate location. The error notification may further indicate that the second location marker $L_2$ may be worn out or damaged.

Figure 4A:
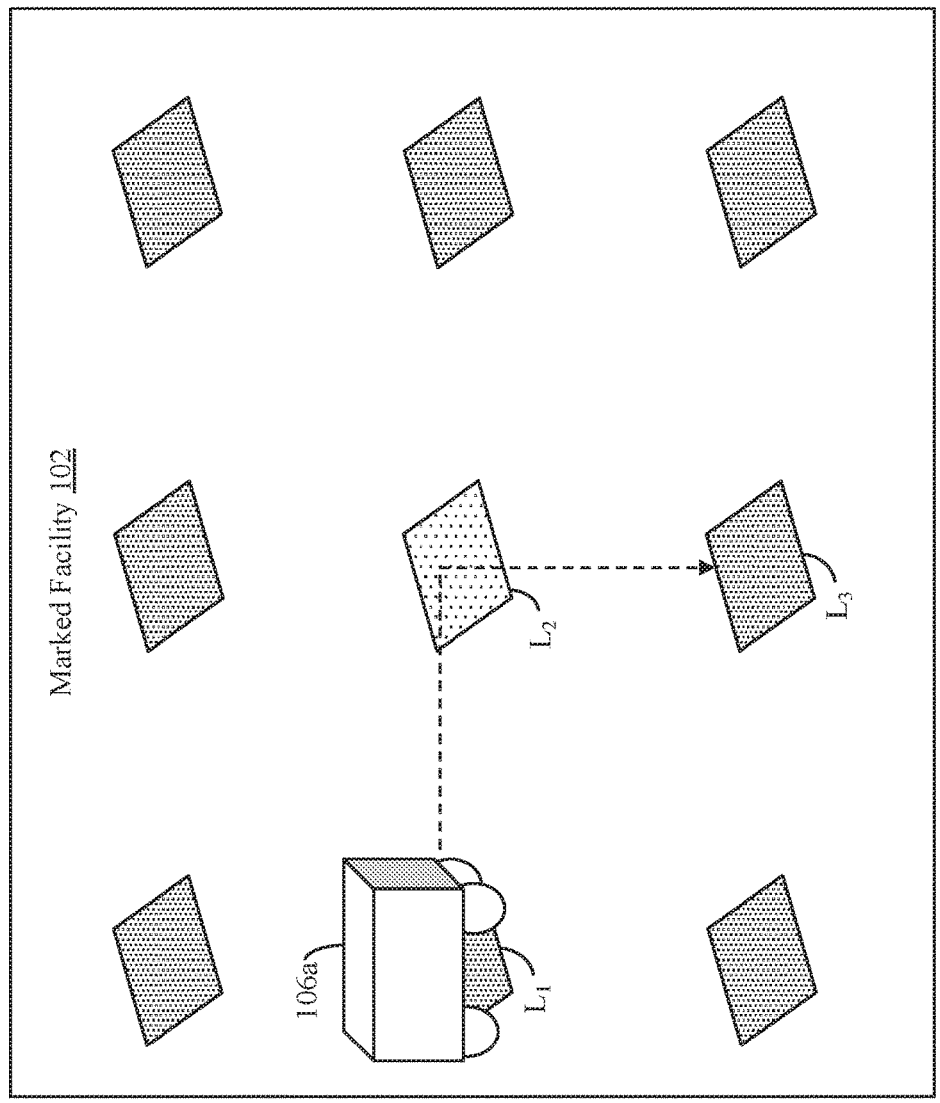

FIGS. 4A-4E, collectively represent an exemplary scenario 400 that describes a method for retracing a planned path by the first transport vehicle 106a, in accordance with another exemplary embodiment of the disclosure. FIG. 4A shows the marked facility 102, the first transport vehicle 106a, the first location marker $L_1$, the second location marker $L_2$, and a third location marker $L_3$.

With reference to FIG. 4A, the CS 104 may receive a second request that requires the first transport vehicle 106a to transit from the first location to a third location, indicated by the third location marker $L_3$, in the marked facility 102. Based on the second request, the CS 104 may determine an optimal path for transiting from the first location to the third location. The determination of the optimal path is described in the foregoing description of FIG. 3A. The determined optimal path is a planned path to be traversed by the first transport vehicle 106a for catering to the second request. As described earlier, the planned path is indicative of a plurality of location markers to be transited by the first transport vehicle 106a in a sequential fashion. For example, as shown in FIG. 4A, the planned path warrants sequential traversal, by the first transport vehicle 106a, of the first, second, and third location markers $L_1$, $L_2$, and $L_3$ (i.e., $L_1 \rightarrow L_2 \rightarrow L_3$).

The CS 104 may communicate, to the first transport vehicle 106a, a transit instruction based on the determination of the planned path. The transit instruction may be indicative of the planned path and estimated distances between consecutive location markers (e.g., a distance between the first and second location markers $L_1$ and $L_2$ and a distance between the second and third location markers $L_2$ and $L_3$) included in the planned path. The transit instruction may further include details of the first through third location markers $L_1$-$L_3$ (e.g., identifiers of the first through third location markers $L_1$-$L_3$). Based on the transit instruction, the first transport vehicle 106a is required to transit from the first location marker $L_1$ to the third location marker $L_3$ by way of the second location marker $L_2$. Initially, when the first transport vehicle 106a is at the first location marker $L_1$ (i.e., at a first time instance $T=t_0$), the value of the counter 216 may be equal to the default value (i.e., c=0). At the first time instance $T=t_0$, the first transport vehicle 106a may start traversing the planned path. While transiting from the first location to the second location along the planned path, the first transport vehicle 106a may record the movement pattern 220 of the first transport vehicle 106a at various time instances (as described in the foregoing description of FIGS. 3A-3D).

With reference to FIG. 4B, the first transport vehicle 106a may reach first through third intermediate locations $IL_1$, $IL_2$, and $IL_3$ at second through fourth time instances $T=t_1$, $T=t_2$, and $T=t_3$, respectively. In a non-limiting example, based on the recorded movement pattern 220 and the estimated distance between the first and second location markers $L_1$ and $L_2$, the first transport vehicle 106a may determine that the first transport vehicle 106a has failed to detect the second location marker $L_2$ (as described in the foregoing description of FIG. 3B). On reaching the third intermediate location $IL_3$, the first transport vehicle 106a may determine that the first transport vehicle 106a has traversed more than the estimated distance between the first and second location markers $L_1$ and $L_2$, and has failed to detect the second location marker $L_2$ at the second location. In such a scenario, the diagnostics unit 218 may run the various diagnostics tests to verify whether the various components (e.g., the scanner 226, the motor 230, or the wheels 234) of the first transport vehicle 106a are functioning properly. In a non-limiting example, diagnostics unit 218 determines that all the various components are functioning properly.

In this scenario, the first transport vehicle 106a may halt at the third intermediate location $IL_3$ and increment the value of the counter 216 (i.e., c=1). As described in the foregoing, the first transport vehicle 106a may compare the value of the counter 216 to the threshold value 222. Based on the comparison, the first transport vehicle 106a may determine that the value of the counter 216 is less than the threshold value 222. Consequently, the first transport vehicle 106a may attempt to retrace a first path followed by the first transport vehicle 106a to reach the third intermediate location $IL_3$ from the first location. The first transport vehicle 106a may retrace the first path to transit from the third intermediate location $IL_3$ to the first location indicated by the first location marker $L_1$ (as described in the foregoing description of FIG. 3C).

With reference to FIG. 4C, the first transport vehicle 106a may begin transiting from the third intermediate location $IL_3$ to the first location at the fourth time instance $T=t_3$. At a fifth time instance $T=t_4$, the first transport vehicle 106a may reach the second intermediate location $IL_2$. At a sixth time instance $T=t_5$, the first transport vehicle 106a may transit from the second intermediate location $IL_2$ to the first intermediate location $IL_1$. At a seventh time instance $T=t_6$, the first transport vehicle 106a may transit from the first intermediate location $IL_1$ to the first location indicated by the first location marker $L_1$. In the current embodiment, it is assumed that the first transport vehicle 106a successfully detects the first location marker $L_1$ and halts at the first location. If the first transport vehicle 106a repeatedly fails to detect the second location marker $L_2$, the first transport vehicle 106a may retrace and re-attempt transiting from the first location to the second location, as long as the value of the counter 216 is less than the threshold value 222. In other words, if the threshold value 222 is equal to 'n', the transport vehicle 106a may retrace and re-attempt transiting from the first location to the second location as long as the value of the counter 216 is less than 'n'.

With reference to FIG. 4D, at a time instance $T=t_{k-3}$ that is after the seventh time instance $T=T_6$, the first transport vehicle 106a may re-attempt to transit from the first location to the second location. At the time instance $T=t_{k-3}$, the value of the counter 216 may be equal to 'n−1' (i.e., '2'). The first transport vehicle 106a may reach a fourth intermediate location $IL_4$ at a time instance $T=t_{k-2}$, a fifth intermediate location $IL_5$ at a time instance $T=t_{k-1}$, and a sixth intermediate location $IL_6$ at $T=t_k$. At the time instance $T=t_k$, the first transport vehicle 106a may determine, again, that it has failed to detect the second location marker $L_2$. The first transport vehicle 106a may halt at the sixth intermediate location $IL_6$ and increment the value of the counter 216 (i.e., c=3). The first transport vehicle 106a may then compare the value of the counter 216 to the threshold value 222, determining that the value of the counter 216 is equal to the threshold value 222. In such a scenario, the first transport vehicle 106a may detect whether the planned path includes a location that is to be traversed after the second location. In the exemplary scenario 400, the first transport vehicle 106a detects a presence of the third location, indicated by the third location marker $L_3$, after the second location in the planned path.

Based on the presence of the third location in the planned path, the first transport vehicle 106a may adjust its angular alignment to orient the first transport vehicle 106a towards the third location marker $L_3$ that indicates the third location. For example, the first transport vehicle 106a may adjust its angular alignment based on a spatial alignment of each of the sixth intermediate location $IL_6$ and the third location with respect to the first location to identify a shortest path to reach the third location from the sixth intermediate location $IL_6$. For adjusting its angular alignment, the first transport vehicle 106a may rotate by θ° and travel along the identified shortest path.

Figure 4E:
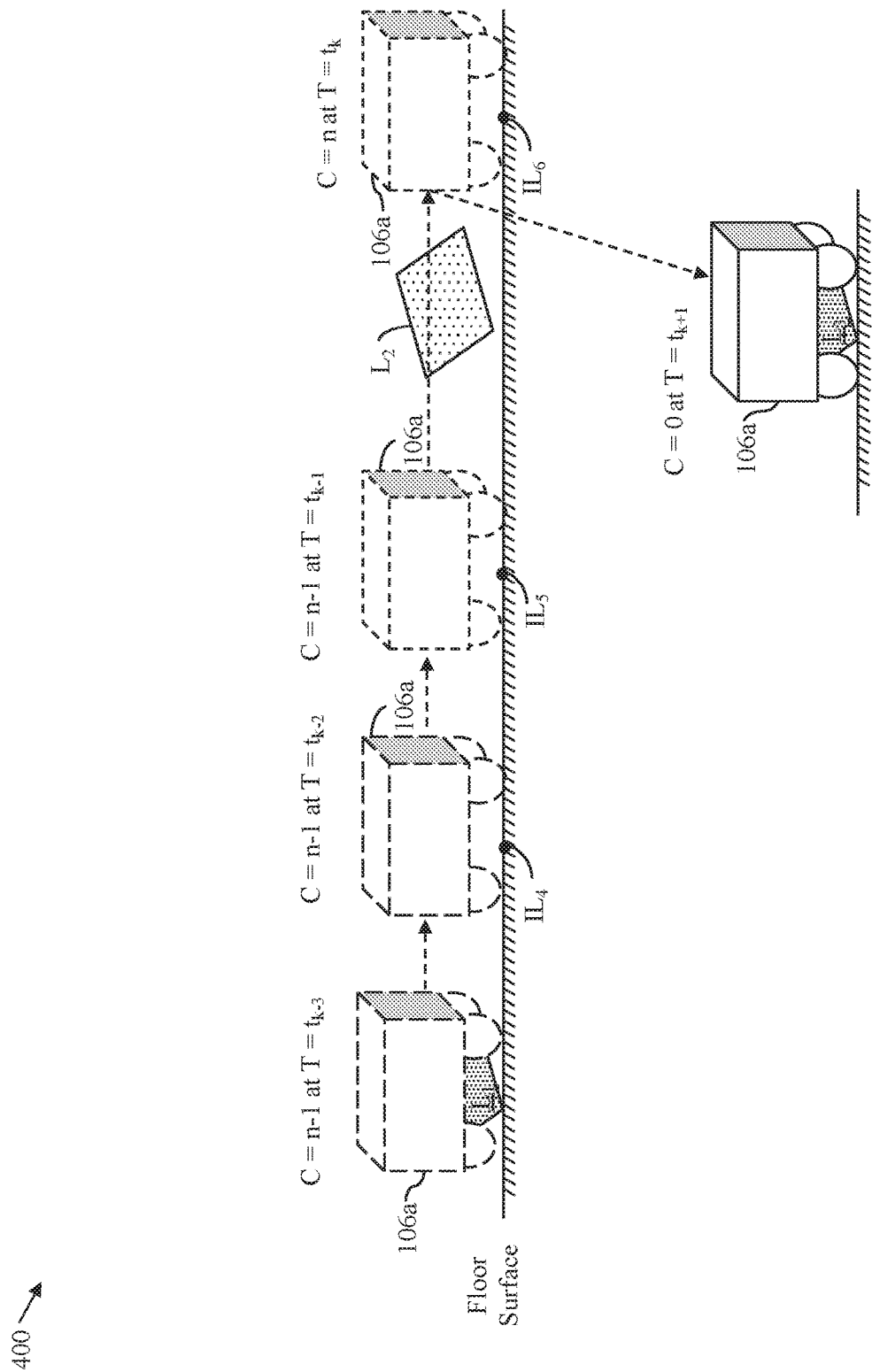

With reference to FIG. 4E, the first transport vehicle 106a may transit from the sixth intermediate location $IL_6$ towards the third location marker $L_3$ based on the identified shortest path and the distance between the second and third location markers $L_2$ and $L_3$. The first transport vehicle 106a is shown to reach the third location marker $L_3$ at a time instance $T=t_{k+1}$. If the first transport vehicle 106a successfully detects the third location marker $L_3$ at the third location, the value of the counter 216 may be reset to the default value (i.e., c=0). Further, the first transport vehicle 106a may communicate, to the CS 104, a notification or a message indicating that the first transport vehicle 106a has reached the third location indicated by the third location marker $L_3$. However, if the first transport vehicle 106a fails to detect the third location marker $L_3$ at the third location, the first transport vehicle 106a may halt at another intermediate location and communicate an error notification to the CS 104.

Figure 5:
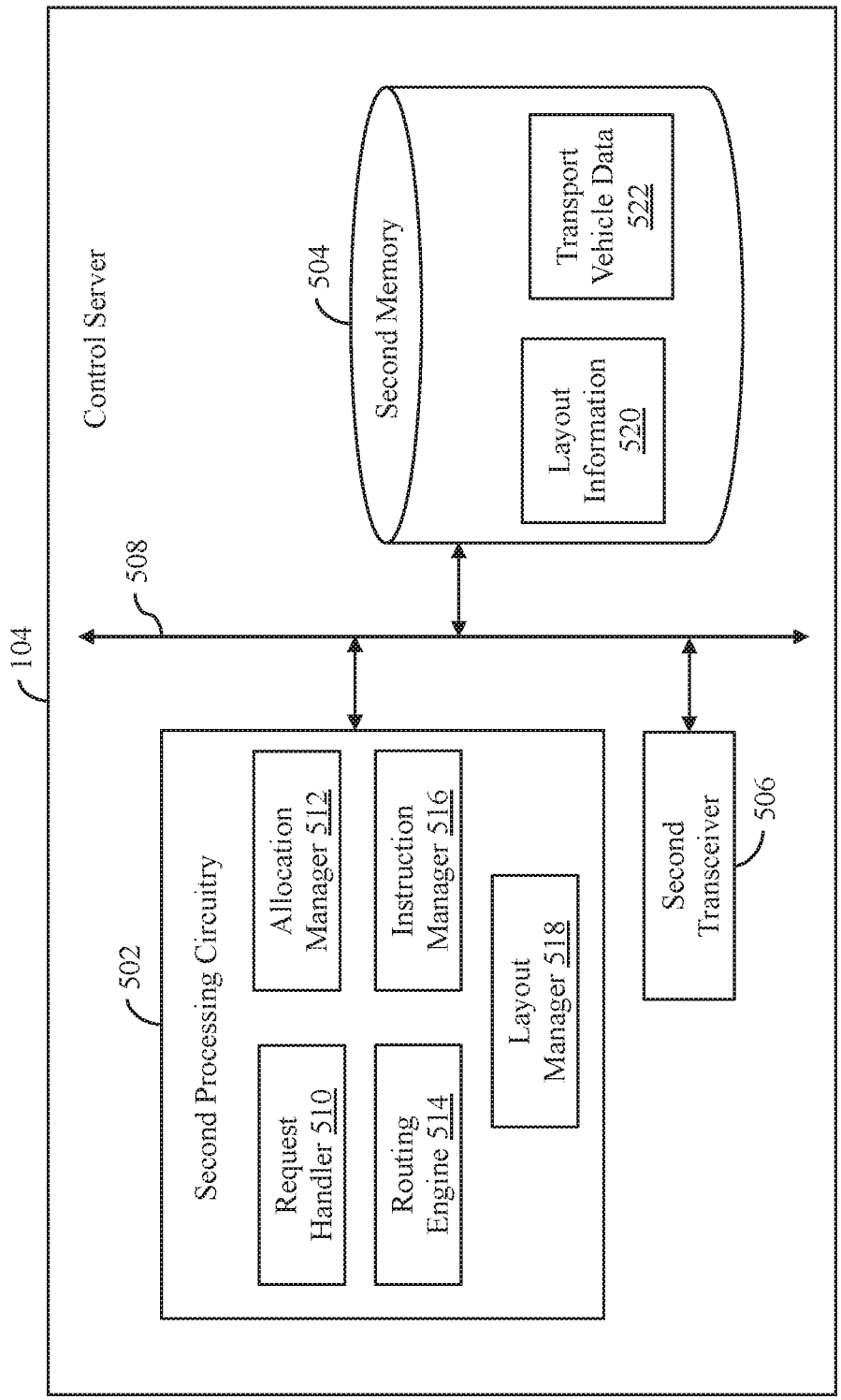
FIG. 5 is a block diagram that illustrates a control server of FIG. 1, in accordance with an exemplary embodiment of the disclosure.

FIG. 5 is a block diagram that illustrates the CS 104, in accordance with an exemplary embodiment of the disclosure. The CS 104 may include a second processing circuitry 502, the second memory (hereinafter, referred to as 'the second memory 504'), and a second transceiver 506 that communicate with each other by way of a second communication bus 508. The second processing circuitry 502 may include a request handler 510, an allocation manager 512, a routing engine 514, an instruction manager 516, and a layout manager 518. It will be apparent to a person having ordinary skill in the art that the CS 104 is shown for illustrative purposes and not limited to any specific combination of hardware circuitry and software.

The second processing circuitry 502 may include suitable logic, instructions, circuitry, interfaces, and/or code, executable by the circuitry, for implementing various operations such as inventory management operations, item procurement operations, order fulfilment operations, or the like. In one embodiment, the second processing circuitry 502 may be configured to select a transport vehicle (for example, the first transport vehicle 106a) and determine optimal paths (e.g., the planned path) for facilitating transportation in the marked facility 102. Examples of the second processing circuitry 502 include, but not limited to, an ASIC processor, a RISC processor, a CISC processor, a FPGA, a combination of a CPU and a GPU, a microcontroller, and/or the like.

The second memory 504 may suitable logic, instructions, circuitry, interfaces, and/or code, executable by the circuitry, to store layout information 520 and the transport vehicle data (hereinafter, referred to as 'the transport vehicle data 522'). Examples of the second memory 504 include a RAM, a ROM, a removable storage drive, a HDD, a flash memory, a solid-state memory, and the like. In one embodiment, the second memory 504 may be realized through various database technologies such as, but not limited to, Microsoft® SQL, Oracle®, IBM DB2®, Microsoft Access®, PostgreSQL®, MySQL® and SQLite®. It will be apparent to a person skilled in the art that the scope of the disclosure is not limited to realizing the second memory 504 in the CS 104, as described herein. In other embodiments, the second memory 504 may be realized in form of an external database server or a cloud storage working in conjunction with the CS 104, without departing from the scope of the disclosure.

The layout information 520 may include the virtual map of the marked facility 102. The virtual map may include information pertaining to the layout of the marked facility 102, such as the pre-determined locations of the location markers, locations of the PSUs, locations of each inventory item or package, or the like. The layout information 520 may further include real-time path availability information of various paths in the marked facility 102. For example, the layout information 520 may indicate that one or more paths in the marked facility 102 are closed down for maintenance.

The transport vehicle data 522 may be indicative of details of the transport vehicles 106 present in the marked facility 102. The details of each of the transport vehicles 106 may include a size, dimensions, a weight carrying capacity, a maximum and minimum speed of a corresponding transport vehicle, or the like. The details of each of the transport vehicles 106 may further include an identifier (such as a numeric or an alpha-numeric code) associated with the corresponding transport vehicle, real-time information such as a real-time location of the corresponding transport vehicle, an indicator that indicates whether the corresponding transport vehicle is carrying a payload, a weight of the payload, or the like. The transport vehicle data 522 may also indicate whether any of the transport vehicles 106 are moving synchronously in the marked facility 102.

The second transceiver 506 transmits and receives data over the communication network 108 using one or more communication network protocols. The second transceiver 506 transmits various requests and instructions to the transport vehicles 106 and receives notifications from the transport vehicles 106. Examples of the second transceiver 506 include, but are not limited to, an antenna, a radio frequency transceiver, a wireless transceiver, a Bluetooth transceiver, an ethernet based transceiver, a USB transceiver, or any other device configured to transmit and receive data.

The second processing circuitry 502 may perform various operations in the marked facility 102 by way of the request handler 510, the allocation manager 512, the routing engine 514, the instruction manager 516, and the layout manager 518. The request handler 510 may process the requests (e.g., the first and second requests) received from the external communication server. The request handler 510 may identify, based on the received requests, inventory items or packages pertinent to the requests. The request handler 510 may further identify one or more operations (e.g., the transportation of the inventory items and/or packages from the first location to the third location) to be performed, based on the received requests. In one embodiment, when the marked facility 102 does not have all inventory items specified in a request, the request handler 510 may queue the request for a specific-time interval until the marked facility 102 receives all the inventory items specified in the request. In one embodiment, the request handler 510 may merge various requests to optimize fulfilment of the requests and improve efficiency and throughput at the marked facility 102.

The allocation manager 512 may handle the allocation of the transport vehicles 106 for performing one or more operations (e.g., transporting a payload) based on the received requests. For example (as described in FIG. 3A), the allocation manager 512 may select the first transport vehicle 106a for transporting the payload from the first location to the second location.

The routing engine 514 may determine optimal paths (e.g., the planned path) for the transport vehicles 106 to transit in the marked facility 102. In one embodiment, if any of the transport vehicles 106 encounter any obstacles while transiting, the routing engine 514 may determine, in real-time, an alternate route for the transport vehicle to transit to a same destination location (e.g., the second location).

The instruction manager 516 may communicate various instructions (e.g., the transit instruction) to the transport vehicles 106 (e.g., the first transport vehicle 106a). The instruction manager 516 may communicate transit instructions to the transport vehicles 106 for transiting from one location to another location (i.e., from a source location to a destination location). For example, the instruction manager 516 may communicate a transit instruction to the first transport vehicle 106a for transiting from the first location to the second location. It will be apparent to those of skill in the art that the instruction manager 516 is not limited to sending transit instructions to the transport vehicles 106. The instruction manager 516 may communicate, to the transport vehicles 106, any instruction that is necessary for operation of the marked facility 102 or the transport vehicles 106.

The layout manager 518 may manage the layout information 520. For example, if there is any change in the layout of the marked facility 102 (such as a change in the arrangement inventory items or packages in the storage area), the layout manager 518 may update the layout information 520 based on the change in the layout.

FIGS. 6A-6D, collectively represent a flow chart 600 that illustrates a process (i.e., method) for traversing a planned path in the marked facility 102, in accordance with an exemplary embodiment of the disclosure. FIGS. 6A-6D have been explained in conjunction with FIGS. 3A-3D and 4A-4E.

Figure 6A:
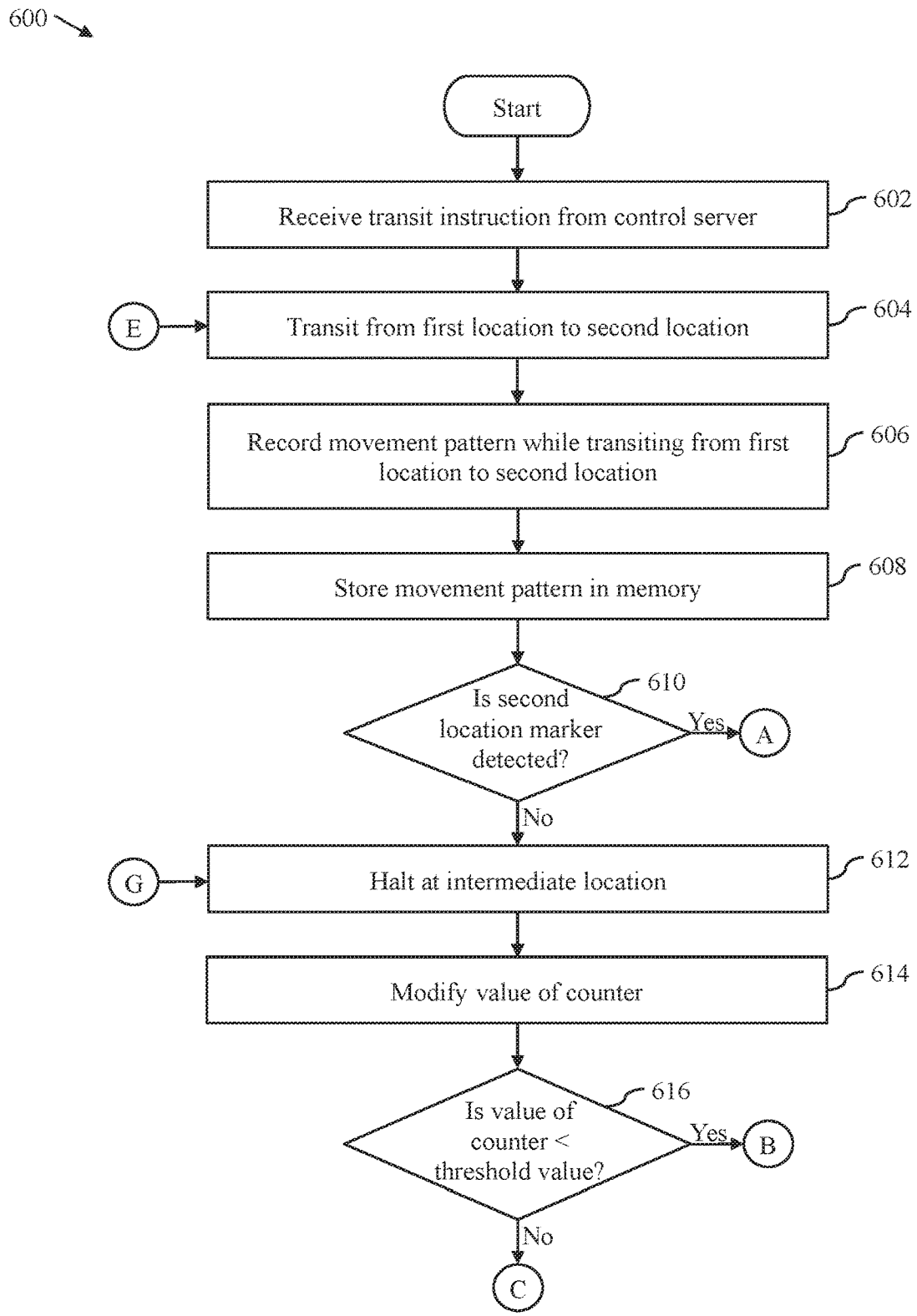
FIGS. 6A-6D, collectively represent a flow chart that illustrates a process for traversing a planned path in a marked facility, in accordance with an exemplary embodiment of the disclosure.

With reference to FIG. 6A, the process starts at step 602, where the first transport vehicle 106a receives a transit instruction, indicative of a planned path, from the CS 104. The process proceeds to step 604, where the first transport vehicle 106a transits from the first location to the second location along the planned path included in the transit instruction (as described in the foregoing description of FIG. 3A). The process proceeds to step 606, where the first transport vehicle 106a records the movement pattern 220 of the first transport vehicle 106a at various time instances (e.g., the first through fourth time instances $T=t_0-T=t_3$), while transiting towards the second location (as described in FIG. 3B). The process proceeds to step 608, where the first transport vehicle 106a stores the recorded movement pattern 220 in the first memory 204. The process proceeds to step 610, where the first transport vehicle 106a determines whether the second location marker $L_2$ is detected. If at step 610, it is determined that the second location marker $L_2$ is detected, the process proceeds to process A as shown in FIG. 6B.

If at step 610, it is determined that the second location marker $L_2$ is not detected (i.e., the first transport vehicle 106a has failed to detect the second location marker $L_2$), the process proceeds to step 612. At step 612, the first transport vehicle 106a halts at an intermediate location (i.e., a current location of the first transport vehicle 106a). For example, as described in FIG. 3B, the first transport vehicle 106a halts at the third intermediate location $IL_3$. The process proceeds to step 614, where the first transport vehicle 106a modifies (here, increments) the value of the counter 216. For example, the value of the counter 216 is incremented from zero (i.e., the default value) to one (i.e., incremented by one). The process proceeds to step 616, where the first transport vehicle 106a determines whether the value of the counter 216 is less than the threshold value 222 (i.e., whether c<n). If at step 616, it is determined that the value of the counter 216 is less than the threshold value 222 (i.e., c<n), the process proceeds to process B as shown in FIG. 6B. If at step 616, it is determined that the value of the counter 216 is not less than the threshold value 222 (i.e., c>=3), the process proceeds to process C as shown in FIG. 6C.

Figure 6B:
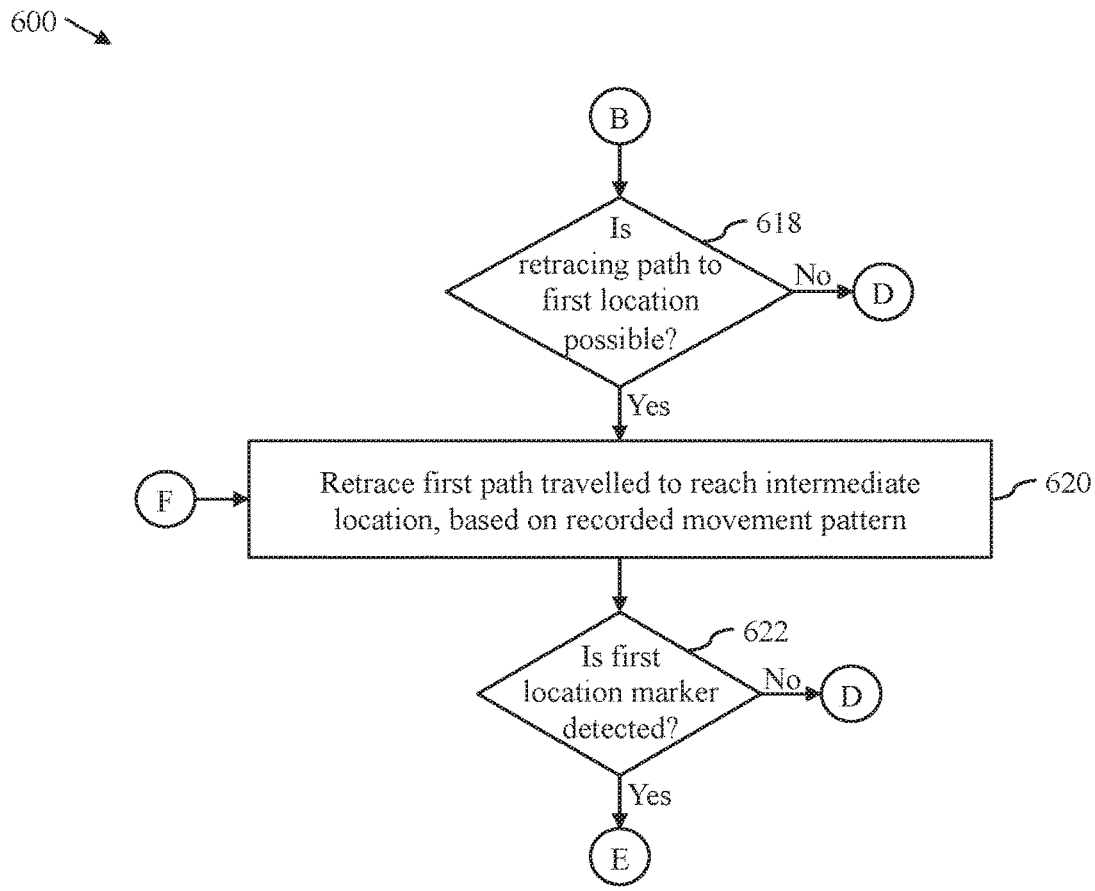

With reference to FIG. 6B, the process B proceeds to step 618, where the first transport vehicle 106a determines whether it is possible to retrace the first path and reach the first location. In other words, the diagnostics unit 218 runs the various diagnostics tests to determine whether the various components of the first transport vehicle 106a are functioning properly. If at step 618, it is determined that it is possible to retrace the first path and reach the first location (i.e., if the various components of the first transport vehicle 106a are functioning properly), the process proceeds to step 620. If step 618, it is determined that it is not possible to retrace the first path and reach the first location (i.e., if the various components of the first transport vehicle 106a are not functioning properly), the process proceeds to process D as shown in FIG. 6C.

At step 620, the first transport vehicle 106a retraces the first path, traversed to reach the intermediate location (e.g., the third intermediate location $IL_3$ of FIG. 3B) from the first location, based on the recorded movement pattern 220. The process proceeds to step 622, where the first transport vehicle 106a determines whether the first location marker $L_1$ is detected. If at step 622, it is determined that the first location marker $L_1$ is detected, the process proceeds to process E, which in turn proceeds to step 604 of FIG. 6A. If at step 622, it is determined that the first location marker $L_1$ is not detected, the process proceeds to the process D as shown in FIG. 6C.

Figure 6C:
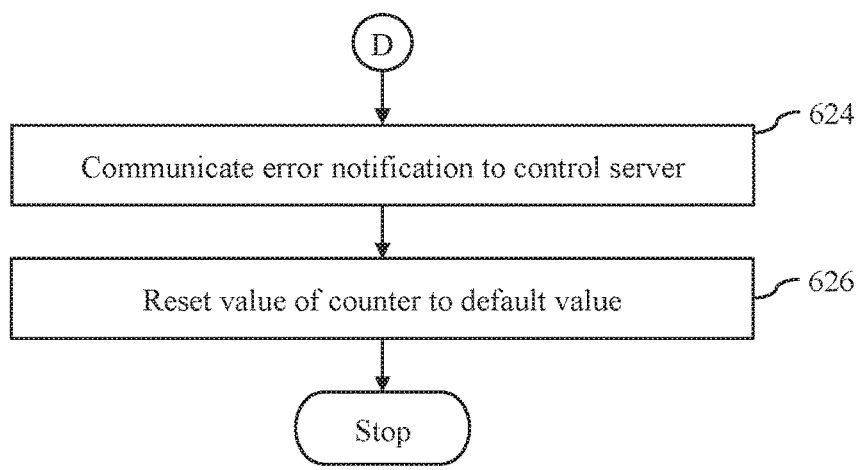

With reference to FIG. 6C, the process D proceeds to step 624, where the first transport vehicle 106a communicates an error notification to the CS 104 indicating an error occurred while executing the transit instruction. The process proceeds to step 626, where the first transport vehicle 106a resets the value of the counter 216 to the default value (i.e., c=0), and then the process proceeds to end.

Figure 6D:
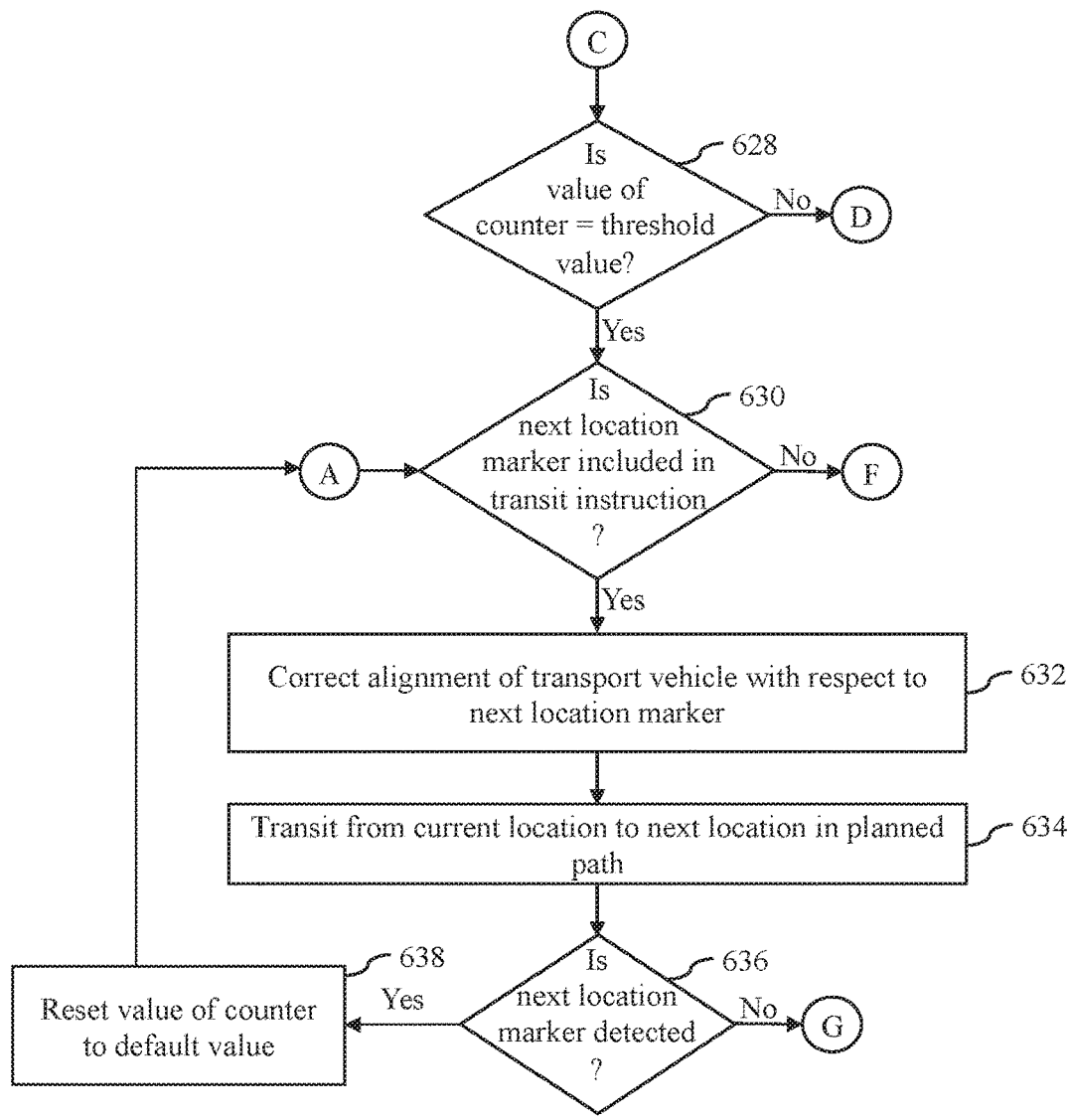

With reference to FIG. 6D, the process C proceeds to step 628, where the first transport vehicle 106a determines whether value of the counter 216 is equal to the threshold value 222 (i.e., if c=n). If at step 628, it is determined that the value of the counter 216 is equal to the threshold value 222, the process proceeds to step 630. If at step 628, it is determined that the value of the counter 216 is not equal to the threshold value 222, the process proceeds to step 624 of FIG. 6C. At step 630, the first transport vehicle 106a attempts to detect a presence of a next location (e.g., the third location) in the planned path. In other words, the first transport vehicle 106a determines whether the planned path further includes any other location (e.g., the third location marker indicated by the third location marker $L_3$) subsequent to the undetected location marker. If at step 630, it is determined that the planned path further includes another location (e.g., the third location indicated by the third location marker $L_3$), the process proceeds to step 632. If at step 630, it is determined that the planned path does not include another location (e.g., the third location indicated by the third location marker $L_3$), the process proceeds to process F, which in turn proceeds to step 620 of FIG. 6B. At step 632, the first transport vehicle 106a corrects its angular alignment (i.e., adjusts an angle of alignment of the first transport vehicle 106a) to orient the first transport vehicle 106a towards an upcoming location marker (e.g., the third location marker $L_3$). The first transport vehicle 106a may correct its angular alignment based on the spatial alignment of each of the intermediate location (e.g., the sixth intermediate location $IL_6$ of FIG. 4E) and the upcoming location marker with respect to the previously traversed location marker.

The process proceeds to step 634, where the first transport vehicle 106a transits from the current location of the first transport vehicle 106a (i.e., the sixth intermediate location $IL_6$) towards the upcoming location marker (e.g., the third location marker $L_3$). The process proceeds to step 636, where the first transport vehicle 106a determines whether the upcoming location marker (e.g., the third location marker $L_3$) is detected. If at step 636 it is determined that the upcoming location marker (e.g., the third location marker $L_3$) is detected, the process proceeds to step 638. At step 638, the value of the counter 216 is reset to the default value (i.e., c=0). The process proceeds to the process A, which in turn proceeds to step 630. If at step 636, it is determined that the upcoming location marker (e.g., the third location marker $L_3$) is not detected, the process proceeds to process G, which in turn proceeds to step 612 of FIG. 6A.

Technological improvements in the processing circuitry (for example, the first processing circuitry 202) of the transport vehicles 106 improves navigation by transport vehicles 106 in the marked facility 102. Embodiments of the disclosure allow the transport vehicles 106 to autonomously recover from failures to detect location markers associated with corresponding planned paths. When a transport vehicle (e.g., the first transport vehicle 106a) fails to detect a location marker associated with a planned path being traversed by the transport vehicle, the transport vehicle may, based on a recorded movement pattern (e.g., the movement pattern 220), retrace a path (e.g., the first path) and reach a last known location (e.g., the first location) associated with a corresponding planned path. Other operations (e.g., operations performed by the second transport vehicle 106b) at the marked facility 102 remain unaffected as the transport vehicle retraces the path, allowing the marked facility 102 to maintain a near-constant throughput. For example, a vicinity of the first transport vehicle 106a need to be cordoned off when the first transport vehicle 106a attempts to retrace the first path. Therefore, the transport vehicles 106 may recover from navigation faults without requiring human intervention, improving a throughput and an efficiency of operations at the marked facility 102. A number of times the transport vehicle is allowed to re-attempt transit the planned path may be controlled by adjusting the threshold value 222. Further, the transport vehicles 106 may communicate error notifications (as described in the foregoing description of FIGS. 1, 3A-3D, and 4A-4E) to the CS 104, enabling the CS 104 to identify damaged or defective location markers in the marked facility 102.

A person of ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present disclosure provide, among other features, systems and methods for traversing the planned path in the marked facility. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for traversing a planned path in a marked facility, the method comprising:
receiving, by a transport vehicle from a control server that is configured to communicate with a plurality of transport vehicles, a transit instruction instructing the transport vehicle to traverse the planned path, wherein the transit instruction includes details of at least first and second location markers including at least an estimated distance between the first and second location markers;
transiting, by a transport vehicle from among the plurality of transport vehicles, from a first location in the marked facility to a second location in the marked facility for traversing the planned path, wherein the first and second locations are indicated by the first and second location markers, respectively;
recording, by the transport vehicle, a movement pattern thereof while transiting from the first location to the second location, wherein the recorded movement pattern includes an angular alignment of the transport vehicle with respect to the first location marker at a plurality of time instances while the transport vehicle is transiting from the first location to the second location;
determining that a distance traversed by the transport vehicle exceeds or equals the estimated distance and failing to detect the second location marker at the second location;
halting, by the transport vehicle, at a current location based on the failure to detect the second location marker at the second location after the transport vehicle determines that the distance traversed by the transport vehicle exceeds or equals the estimated distance;
the transport vehicle adjusts its angular alignment to orient itself toward the first location marker and retracing a first path traversed to reach the current location from the first location based on the recorded movement pattern, wherein on reaching the first location, the transport vehicle re-attempts to transit from the first location to the second location;
communicating, by the transport vehicle to the control server, an error notification after the transport vehicle reaches a threshold number of failures to detect the second location marker; and
identifying, by the control server, the second location marker to be damaged in response to receiving the error notification communicated by the transport vehicle.

2. The method of claim 1, further comprising modifying, by the transport vehicle, a value of a counter from a first value to a second value based on the failure to detect the second location marker.

3. The method of claim 2, wherein the second value is less than a threshold value and the first path is retraced by the transport vehicle in response to the second value being less than the threshold value.

4. The method of claim 2, further comprising resetting, by the transport vehicle, the counter to a default value based on a detection of the second location marker at the second location during the re-attempt to transit from the first location to the second location.

5. The method of claim 2, wherein the second value is equal to a threshold value and the method further comprising:
detecting, by the transport vehicle, a presence of a third location after the second location in the planned path in response to the second value being equal to a threshold value, wherein the third location is indicated by a third location marker;
detecting the presence of the third location in the planned path; and
transiting, by the transport vehicle, from the current location to the third location indicated by the third location marker in response to the presence of the third location being detected in the planned path, wherein the transport vehicle transits from the current location to the third location based on a spatial alignment of each of the current location and the third location with respect to the first location.

6. The method of claim 2, wherein the second value is greater than a threshold value and the method further comprising communicating, by the transport vehicle to the control server, the error notification in response to the second value is greater than a threshold value.

7. The method of claim 1, further comprising storing, by the transport vehicle in a memory, the recorded movement pattern.

8. The method of claim 1, wherein the recorded movement pattern further includes a speed of the transport vehicle or a direction in which the transport vehicle is accelerating, at the plurality of time instances while the transport vehicle is transiting from the first location to the second location.

9. A system for traversing a planned path in a marked facility, the system comprising:
a plurality of location markers affixed on a floor surface of the marked facility, wherein the plurality of location markers are indicative of a plurality of locations in the marked facility;
a control server that is configured to communicate with a plurality of transport vehicles; and
a transport vehicle, among the plurality of transport vehicles, that is configured to:
receive, from the control server, a transit instruction instructing the transport vehicle to traverse the planned path, wherein the transit instruction includes details of at least first and second location markers including at least an estimated distance between the first and second location markers;
transit from a first location in the marked facility to a second location in the marked facility for traversing the planned path, wherein the first and second locations are indicated by the first and second location markers of the plurality of location markers,
record a movement pattern thereof while transiting from the first location to the second location, wherein the recorded movement pattern includes an angular alignment of the transport vehicle with respect to the first location marker at a plurality of time instances while the transport vehicle is transiting from the first location to the second location, determine whether a distance traversed by the transport vehicle exceeds or equals the estimated distance and while failing to detect the second location marker at the second location, halt at a current location based on the failure to detect the second location marker at the second location after the transport vehicle determines that the distance traversed by the transport vehicle exceeds or equals the estimated distance, adjust an angular alignment of the transport vehicle to orient the transport vehicle toward the first location marker and retrace a first path traversed to reach the current location from the first location based on the recorded movement pattern, wherein on reaching the first location, the transport vehicle re-attempts to transit from the first location to the second location, and communicate to the control server, an error notification when the transport vehicle reaches a threshold number of re-attempts to detect the second location marker, wherein the control server is configured to identify the second location marker to be damaged based on receiving the error notification communicated by the transport vehicle.

10. The system of claim 9, wherein the transport vehicle is further configured to modify a value of a counter from a first value to a second value based on the failure to detect the second location marker.

11. The system of claim 10, wherein the first path is retraced by the transport vehicle in response to the second value being less than a threshold value.

12. The system of claim 10, wherein the transport vehicle is further configured to reset the counter to a default value based on a detection of the second location marker at the second location during the re-attempt to transit from the first location to the second location.

13. The system of claim 10, wherein the transport vehicle is further configured to:

detect a presence of a third location after the second location in the planned path in response to the second value being equal to a threshold value, wherein the third location is indicated by a third location marker of the plurality of location markers, and transit from the intermediate location to the third location indicated by the third location marker in response to the presence of the third location being detected in the planned path, wherein the transport vehicle transits from the current location to the third location based on a spatial alignment of each of the current location and the third location with respect to the first location.

14. The system of claim 10, wherein the transport vehicle is further configured to communicate the error notification to the control server in response to the second value being greater than a threshold value.

15. The system of claim 9, wherein the transport vehicle comprises a memory for storing the recorded movement pattern.

16. The system of claim 9, wherein the recorded movement pattern further includes a speed of the transport vehicle or a direction in which the transport vehicle is accelerating, at the plurality of time instances while the transport vehicle is transiting from the first location to the second location.

* * * * *